United States Patent
Aramoto et al.

(10) Patent No.: US 9,820,257 B2
(45) Date of Patent: *Nov. 14, 2017

(54) COMMUNICATION SYSTEM, MOBILE COMMUNICATION TERMINAL AND POSITION MANAGING APPARATUS

(71) Applicant: Sharp Kabushiki Kaisha, Sakai, Osaka (JP)

(72) Inventors: Masafumi Aramoto, Osaka (JP); Shohei Yamada, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/355,863

(22) Filed: Nov. 18, 2016

(65) Prior Publication Data

US 2017/0070972 A1 Mar. 9, 2017

Related U.S. Application Data

(60) Division of application No. 14/805,288, filed on Jul. 21, 2015, now abandoned, which is a continuation of
(Continued)

(30) Foreign Application Priority Data

Mar. 23, 2007 (JP) ................. 2007-077908

(51) Int. Cl.
*H04W 4/00* (2009.01)
*H04W 64/00* (2009.01)
(Continued)

(52) U.S. Cl.
CPC ....... *H04W 64/003* (2013.01); *H04L 61/2007* (2013.01); *H04W 40/20* (2013.01); *H04W 60/005* (2013.01); *H04W 80/045* (2013.01)

(58) Field of Classification Search
CPC ...................................... H04W 80/04
(Continued)

(56) References Cited

U.S. PATENT DOCUMENTS

2005/0128795 A1 6/2005 DeHerrera et al.
2005/0128975 A1 6/2005 Kobayashi et al.
(Continued)

FOREIGN PATENT DOCUMENTS

WO WO 2006/106712 A1 10/2006
WO WO 2008/126357 A1 10/2008

OTHER PUBLICATIONS

Abeille, J. et al., "MobiSplit: a Scalable Approach to Emerging Mobility Networks", XP-002491899, Proceeding of First ACM/IEEE International Workshop on Mobility in the Evolving Internet Architecture, San Francisco, CA, Dec. 1, 2006, URL: http://portal.acm.org/citation.cfm?id=1186708, pp. 17-22.
(Continued)

*Primary Examiner* — Samina Choudhry
(74) *Attorney, Agent, or Firm* — Birch, Stewart, Kolasch & Birch, LLP

(57) ABSTRACT

A mobile node includes a plurality of transceivers, has a network conforming to network-based mobility as its home link and performs position registration to a positional managing apparatus and performs position registration to the position managing apparatus through a foreign network by position registration conforming to host-based mobility. In mobile node and position managing apparatus, a plurality of routes passing through the home link and the foreign link are established. Accordingly, when the mobile node has the plurality of transceivers, it can simultaneously connect to the home link and the foreign link through respective transceivers, to perform communication.

12 Claims, 18 Drawing Sheets

Related U.S. Application Data application No. 12/532,556, filed as application No. PCT/JP2008/055269 on Mar. 21, 2008, now Pat. No. 9,113,435.

(51) Int. Cl.
*H04W 40/20* (2009.01)
*H04W 60/00* (2009.01)
*H04L 29/12* (2006.01)
*H04W 80/04* (2009.01)

(58) Field of Classification Search
USPC ........................................................ 370/328
See application file for complete search history.

(56) References Cited

U.S. PATENT DOCUMENTS

| | | |
|---|---|---|
| 2006/0146742 A1 | 7/2006 | Kawahara et al. |
| 2007/0186100 A1 | 8/2007 | Wakameda |
| 2007/0291750 A1 | 12/2007 | Nylander |
| 2008/0117884 A1 | 5/2008 | Ishii et al. |
| 2009/0019180 A1 | 1/2009 | Aso et al. |
| 2010/0103876 A1 | 4/2010 | Aso |

OTHER PUBLICATIONS

Aso et al., "Proposal on MobileIPv6 extension for using multiple interfaces by mobile node", IEICE Technical Report, IN2006-21(Jun. 2006), Jun. 15, 2006 with partial English translation.

D. Johnson et al., Mobility Support in IPv6, RFC 3775, [online], 2004.6. [retrieved on Jun. 2, 2008]. <URL:http://\NWW.watersprings.org/pub/rfc/rfc3775.txt.>.

European Search Report issued in European Application No. 08738692.6 on Sep. 11, 2014.

R. Wakikawa et al., Multiple Care-of Addresses Registration, draft-ietf-monami6-multipecoa-01.txt, [online] 2006-1 0. [retrieved on Jun. 2, 2008]. <URL:http://www. watersp rlnqs .org/pub/rfc/rfc3775. txt.>.

S. Gundavelli et al., Proxy Mobile IPv6, draft-sgundave-mip6-proxymip6-01, [online], 2007.1, [retrieved on Jun. 2, 2008]. <URL:http://www.watersprings.org/pub/id/draFt-sgundave-rnip6-proxymip6-Q1_txt>.

Office Action, dated Nov. 6, 2015, in U.S. Appl. No. 14/805,288.

| Address | Default Router | Position Managing Apparatus |
|---|---|---|
| HoA(P1::MN1) | PMA 30 | — |
| CoA(P2::MN1) | AR 10 | HA 40 |
| ⋮ | ⋮ | ⋮ |

| Attachment Node | Forwarding Position |
|---|---|
| Mobile Node 20 | HoA(P1::MN1) |
| ⋮ | ⋮ |
| The others | HA 40 |

| Mobile Node | Position |
|---|---|
| Mobile Node 20 (HoA(P1: :MN1)) | PMA 30 |
| Mobile Node 20 (HoA(P1: :MN1)) | CoA(P2: :MN1) |
| ⋮ | ⋮ |

COMMUNICATION SYSTEM, MOBILE COMMUNICATION TERMINAL AND POSITION MANAGING APPARATUS

CROSS-REFERENCE

This application is a Divisional of copending application Ser. No. 14/805,288, filed on Jul. 21, 2015; which is a Continuation of application Ser. No. 12/532,556, filed Sep. 22, 2009, issued on Aug. 18, 2015 as U.S. Pat. No. 9,113,435; which was filed as a 371 Application of PCT International Application No. PCT/JP2008/055269 on Mar. 21, 2008, which claims the benefit under 35 U.S.C. §119(a) to Japanese Patent Application No. JP2007-077908, filed in Japan on Mar. 23, 2007, all of which are hereby expressly incorporated by reference into the present application.

TECHNICAL FIELD

The present invention relates to a communication system or the like, including: a mobile communication terminal that includes a plurality of transceivers and connects through the transceivers to a home link that is constructed of a network performing network-based mobile management and a foreign link; and a position managing apparatus for managing the position of the mobile communication terminal.

BACKGROUND ART

In the internet, network-based mobility (see non-patented document 1, for instance) and host-based mobility (see non-patented document 2, for instance) have been known as the technologies that offer IP-layer mobility of a node to permit its continuation of communication with another node at the opposite communication end even if the node changes its connection from one link to another as it moves.

For example, Proxy Mobile IPv6 (PMIPv6, hereinbelow) as the network-based mobility disclosed in non-patented document 1 sets up a PMIP network for the network, to which a mobile node is connected, and in which an access gateway (PMA: Proxy Mobile Agent) as a default router for the mobile node and a position managing apparatus (HA: Home Agent) for managing the PMA to which the mobile node attaches itself are defined.

The HA assumes the PMA to which the mobile node is connected as the positional information of the mobile node and manages the identification information on the mobile node in association with the identification information on the PMA. In the HA, the PMA to which the mobile node is connected is continuously updated as the mobile node moves so as to maintain the positional information.

The mobile node has a unique IP address which identifies itself and transmits a packet to the PMIP network by designating the IP address for the receiver and sender of the packet to be communicated between mobile nodes. The PMA to be the point of connection of the mobile node in the core network forwards the packet to the HA. The HA determines the PMA to which the destination mobile node is attached, based on the positional information and forwards the packet.

Accordingly, inside the PMIP network, a forwarding route is established between the HA and the PMA so that the packet is conveyed between mobile nodes by packet forwarding.

In PMIPv6, the mobile node continues communication by only changing the PMA as a default router as the mobile node moves. Inside the PMIP network, the positional information is updated in the PMAs and HA so as to perform packet forwarding to thereby realize communication between mobile nodes. The mobile node continues communication by changing PMAs as it moves, but it can continue using the unique address if it connects to any PMA. This makes it possible to minimize the movement process to be effected by the mobile node and brings about the advantage that the number of control signals can be reduced in the wireless section.

On the other hand, non-patented document 2 describes Mobility Support in IPv6 (MIPv6 hereinbelow) as one example of host-based mobility. MIPv6 defines a mobile node that changes the point of connection to the network with moving and a position managing apparatus (HA: Home Agent) for performing positional management of the mobile node.

A mobile node holds a unique and unvaried IP address that identifies itself on the network, and uses it as the receiver and sender of a transmitted/received packet in communication between mobile nodes. Further, the mobile node acquires an address on a visited network and the acquired address is registered as its positional information to the HA. In the HA, the IP address that identifies the mobile node and the IP address acquired at the visited site for identifying the position are managed in association with each other.

The packet which the mobile node sends out to another mobile node is forwarded by the HA based on the address acquired at the visited site. Specifically, the packet which mobile node 1 transmits to mobile node 2 is forwarded to the HA by tunneling the IP packet having the address of mobile node 1 acquired at the visited site set as the sender and the HA set as the receiver. The HA solves the positional information of mobile node 2 on the receiver side and forwards the transmission packet to the address of mobile node 2 acquired at the visited site, by tunneling the IP packet having the HA set as the sender and the address of mobile node 2 acquired at the visited site set as the receiver. The packets between mobile nodes are delivered in the above way.

In the internet, it was conventionally impossible for a terminal to continue communication by changing its connection point, but the aforementioned PMIPv6 and MIPv6 have enabled a mobile node to continue communication using a single IP address even if the mobile node changes its network connection point.

In PMIPv6 and MIPv6, a mobile node can move while changing its connection point. However, it is impossible for a mobile node to have a plurality of transmitter-receivers and establish connection to networks at the same time. In order to solve this problem, Multiple Care-of Addresses Registration (MCoA hereinbelow) (see non-patented document 3, for instance) has been defined.

In MCoA, the mobile node includes a plurality of transmitter-receivers, which each register an address obtained from the networks to which they connect, as their positional information, to the HA. A series of registering procedures is expanded based on MIPv6. The difference from MIPv6 is that the mobile node registers plural positional information addresses to the HA and that the HA and the mobile node have a plurality of packet delivery routes. The HA and the mobile node can transmit a packet using a delivery route selected based on the type of the packet or preferences when the packet is delivered.

Non-patented document 1: S. Gundavelli, et al., "Proxy Mobile IPv6", draft-sgundave-mip6-proxymip6-01, January 2007;

Non-patented document 2: D. Johnson, et al., "Mobility Support inIPv6", RFC 3775, June 2004; and Non-patented document 3: R. Wakikawa, et al., "Multiple Care-of Addresses Registration", draft-ietf-monami6-multiplecoa-01.txt, October 2006.

DISCLOSURE OF INVENTION

Problems to be Solved by the Invention

In the case where a network that supports network-based mobility and a network that supports host-based network base coexist and a mobile node moves between these networks, the system is constructed of PMIPv6 and MIPv6 schemes in combination, as shown in FIG. 20.

The HA for PMIPv6 and the HA for MIPv6 are provided in an identical apparatus so that the movement between the PMIP network and the foreign network is managed based on MIPv6 and the movement inside the PMIP is managed based on PMIPv6. When the mobile node moves changing its PMA inside the PMIP network, the mobile node performs communication using the MIPv6 home address. When the mobile node moves to the foreign network outside the PMIP network, the mobile node registers its position to the HA using its care-of address obtained in the foreign network to continue communication.

A PMIP network is characterized in that a mobile node receives the same network information if it connects to any of the PMAs on the PMIP network, so as to continue communication using a single address. In other words, this is a method of managing movement of a mobile node inside the PMIP network so as to hide movement to a terminal. A PMIP network can be made large in scale by a trader that manages networks. For example, a communication carrier constructs a large-scale PMIP network that covers all over Japan, and the subscriber terminal can continue communication by connecting to any of the PMAs using a single address.

On the other hand, as a foreign network on which movement management based on MIPv6 is needed, a hot spot that uses an access system such as a WLAN or the like implemented by a trader different from the communication carrier that operates the PMIP network can be presumed. Under these circumstances, a mobile node can connect to them by including both the transmitter-receiver for accessing the communication carrier network and the transmitter-receiver for accessing the hot spot.

Since in the large-scale communication carrier network, or the PMIP network, a mobile node can behave as a mere IP node without any need of movement management, it is preferred that the PMIP network is the home link defined based on MIPv6. That is, the HA of PMIPv6 enables the mobile node to perform communication with the home address by managing the PMA which the mobile node connects to, as its positional information.

Further, when the mobile node moves from the PMIP network to the foreign network, it moves from the home link defined by MIPv6 to the foreign link. Movement management is performed by the HA, which manages correspondence between the home address of the mobile node and its care-of address, to continue communication.

Accordingly, when the mobile node includes a plurality of transceivers and connects to both the PMIP network and the foreign network simultaneously through respective transceivers, the mobile node realizes simultaneous connection to the home link defined by MIPv6 and the foreign link.

A method for a mobile node based on MIPv6 including a plurality of transceivers to perform simultaneous connection to the networks through respective transceivers is defined by MCoA. However, this method could permit only the connection shown below and could not permit simultaneous connection to both the home link and the foreign link.

(1) Of the connections through a plurality of transceivers, when one connects to the home link, only the transceiver that connects to the home link is used to continue communication without use of the transceiver that connects to the foreign link.

(2) Of the connections through a plurality of transceivers, when one connects to the home link, only the transceiver that connects to the foreign link is used to continue communication without use of the transceiver that connects to the home link.

Accordingly, when a PMIP network is employed as the home link and simultaneous connection to the home link and the foreign link is tried, it has been impossible for the mobile node to achieve simultaneous connection by using MCoA.

This limitation is caused by the function that the HA receives the packet that is addressed to the mobile node, in MIPv6 and MCoA. For the HA, two methods of installation as shown in FIGS. 21(a) and (b) are defined.

In FIG. 21(a), the HA has a position managing function and also serves as a border router in the home link so as to be connected to the foreign network. In FIG. 21(b), the HA has a position managing function but a separate border router for home link is installed to be connected to the foreign network.

A packet transmitted to a mobile node from a communication terminal connected to the foreign network is transmitted to the boarder router of the home link by the routing scheme of the conventional internet. When the mobile node connects to the foreign link, the HA receives the packet in place of the mobile node and forwards it to the visited site. When the mobile node is connected to the home link, the mobile node in the home link receives the packet without intermediary of the HA.

In order for the HA to receive the packet instead of the mobile node, the HA uses a function called ProxyNDP. ProxyNDP is a HA's function which announces the fact that HA will receive a packet addressed to the mobile node to the home link so as to receive the packet. The HA receives packets by ProxyNDP only when the mobile node is out and makes the ProxyNDP function invalid when the mobile node has returned to the home link so that the mobile node can receive the packets.

As a result, even in the case where the HA does not serve as a border router as shown in FIG. 21(b), the HA can initially receive the packet addressed to the mobile node, which the boarder router routed to the home link and can forward it to the visited site.

Accordingly, there has been the problem that the mobile node cannot receive the packet in the home link if the HA sets the ProxyNDP function valid. On the other hand, when HA sets the ProxyNDP function invalid, there is the problem that the mobile node can receive the packet at the home link but the HA cannot receive packets temporarily.

In MCoA, when the mobile node connects to its home link through one of plural transceivers and connects to the foreign link through the other transceiver, it is necessary to perform reception at the transceiver connected to the home link, and reception of the packet once received by the HA and forwarded to the foreign link, at the transceiver connected to the foreign link. However, there has been the problem that this cannot be realized because of the aforementioned ProxyNDP limitation.

In view of the above problems, it is therefore an object of the present invention to enable a mobile node including a plurality of transceivers to perform communication by its simultaneous connection to the home link and foreign link through the respective transceivers.

Means for Solving the Problems

In view of the above problems, a communication system of the present invention, includes: a mobile communication terminal including a plurality of transceivers and connecting through the transceivers to a home link that is constructed of a network performing network-based mobile management and a foreign link; and a position managing apparatus for managing a position of the mobile communication terminal, and is characterized in that the mobile communication terminal includes a position registering means for registering positional information thereof in the network to which the mobile communication terminal connects, into the position managing apparatus, the position managing apparatus includes: a packet transmitting and receiving means for receiving a packet addressed to the mobile communication terminal and transmitting a packet to be transmitted from the mobile communication terminal; a packet destination determining means for determining a destination of the packet from the packet received by the packet transmitting and receiving means; and, a positional information storing means for storing the positional information registered by the position registering means in association with the mobile communication terminal, and, the packet transmitting and receiving means determines a position of a receiver as the destination determined by the packet destination determining means, from the positional information storing means to transmit the packet.

Also, the communication system of the present invention is characterized in that the mobile communication terminal simultaneously connects to the home link through one transceiver and the foreign link through another transceiver.

Further, the communication system of the present invention is characterized in that the positional information storing means stores a plurality of positional information corresponding to the mobile communication terminal, and the packet transmitting and receiving means, when receiving the packet addressed to the mobile communication terminal, selects one positional information from the positional information stored by the positional information storing means and transmits the packet by determining a route based on the selected positional information.

Moreover, the communication system of the present invention is characterized in that the position registering means registers the positional information of the mobile communication terminal in the home link and the positional information in the foreign link, individually.

Still more, the communication system of the present invention is characterized in that the mobile communication terminal is assigned with a home address, the positional information includes an address of a router to which the mobile communication terminal connects in the home link or an address acquired by the mobile communication terminal in the foreign link, and the mobile communication terminal further includes: an address storing means for storing the address and the home address of the mobile communication terminal in a related manner; a packet creating means for creating a packet by determining an address to be a sender, from the address storing means, in association with the network through which the receiver of the packet passes; and a packet transmitting means for transmitting the packet created by the packet creating means.

A mobile communication terminal of the present invention, includes a plurality of transceivers and connecting through the transceivers to a home link that is constructed of a network performing network-based mobile management and a foreign link, and is characterized in that the mobile communication terminal is assigned with a home address, and performs communication based on an address storing means for storing an address of a router to which the mobile communication terminal connects in a home link and an address acquired by the mobile communication terminal in a foreign link, in association with a home address of the mobile communication terminal, a route determining means for determining a route of communication, a selecting means for selecting an address associated with the home address of the mobile communication terminal stored in the address storing means, in accordance with a network through which the communication route determined by the route determining means passes, and the address selected by the selecting means.

Also, the mobile communication terminal of the present invention is characterized in that it simultaneously connects to the home link through one transceiver and the foreign link through another transceiver.

The position managing apparatus resides in a position managing apparatus for managing the position of a mobile communication terminal individually connected to a home link that is constructed of a network performing network-based mobile management and a foreign link, comprising: a positional information storing means for storing positional information of the mobile communication terminal; a means for transmitting and receiving a packet addressed to the mobile communication terminal and a packet transmitted from the mobile communication terminal; and, a packet destination determining means for determining a destination of a packet, from the packet received by the packet transmitting and receiving means, and is characterized in that the packet transmitting and receiving means determines a position of the destination determined by the packet destination determining means, from the positional information storing means and transmits the packet.

Also, the position managing apparatus of the present invention is characterized in that the positional information storing means stores a plurality of positional information corresponding to the mobile communication terminal, the packet transmitting and receiving means, when receiving a packet addressed to the mobile communication terminal, selects one positional information from the positional information stored by the positional information storing means and transmits the packet by determining a route based on the selected positional information.

Advantage of the Invention

According to the present invention, in the communication system including: the mobile communication terminal including the plurality of transceivers and connecting through the transceivers to the home link that is constructed of the network performing network-based mobile management and the foreign link; and the position managing apparatus for managing the position of the mobile communication terminal, the position managing apparatus, when receiving a packet, determines the position of the receiver of the packet based on the positional information storing means stored in the position managing apparatus and sends the packet. Here, when a PMIP network is employed as the home link, the position managing apparatus will be able to transmit the packet appropriately to the receiver terminal either by way of the PMIP network or by way of the foreign network.

Also, according to the present invention, it is possible for the mobile communication terminal to connect to the home link and the foreign link, at the same time. Accordingly, the mobile communication terminal is able to perform communication at any time by way of either of the networks.

Further, according to the present invention, in the mobile communication terminal including a plurality of transceivers and connecting through the transceivers to the home link that is constructed of the network performing network-based mobile management and the foreign link, the address of the router to which the mobile communication terminal connects in the home link and the address acquired by the mobile communication terminal in the foreign link are stored in association with the home address assigned to the mobile communication terminal. With this, one address that is associated with the home address of the mobile communication terminal is selected in accordance with the network that the communication route passes through, to perform communication. Upon this, the mobile communication terminal is connected to the home link by way of one transceiver and connected to the foreign link by way of another transceiver, to achieve simultaneous connect to the home link and the foreign link.

Moreover, according to the present invention, the position managing apparatus stores the plurality of positional information for the mobile communication terminal into the positional information storing means. Accordingly, when a packet is transmitted to the mobile communication terminal, it is possible to determined the route based on the positional information stored in the positional information storing means and transmit the packet.

DESCRIPTION OF REFERENCE NUMERALS

Figure 1:
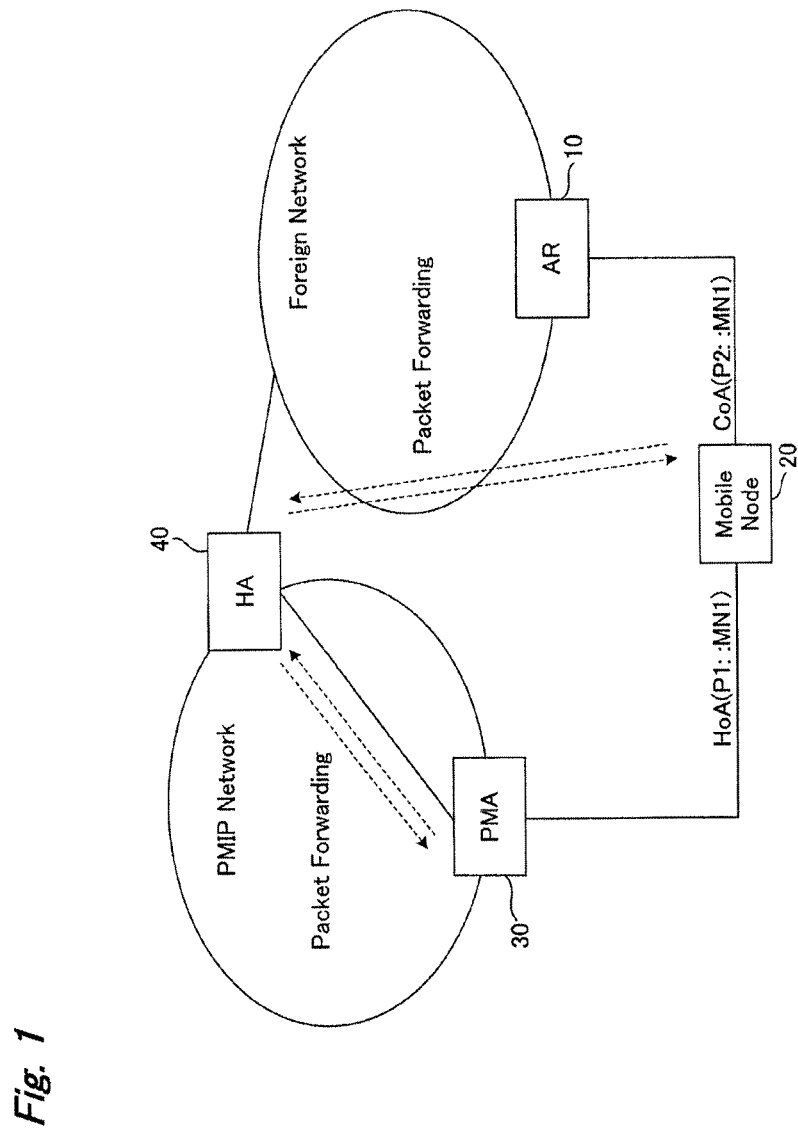
FIG. 1 A diagram showing the outline of a communication system.

10 access router (AR)
20 mobile node
200 processor
202 first transceiver
204 second transceiver
206 storage
2062 address management table
208 PMIPv6 processor
210 MIPv6 processor
212 packet transmitter
30 PMA
300 processor
302 wireless transceiver
304 wired transceiver
306 storage
3062 attachment node management table
308 PMIPv6 processor
310 packet forwarder
40 position managing apparatus (HA)
400 processor
402 PMIP network transceiver
404 foreign network transceiver
406 Storage
4062 positional information management table
408 PMIPv6 processor
410 MIPv6 processor
412 packet forwarder

BEST MODE FOR CARRYING OUT THE INVENTION

Now, the best example of a packet communication system in the case to which the present invention is applied will be described using the drawings.

1. Configuration 1.1 Network Configuration

To begin with, the packet communication system in the present exemplary embodiment is constructed of networks conforming to network-based mobility and host-based mobility, and has a configuration that can connect to a PMIP network as the home link and a foreign network as the foreign link at the same time, as shown in FIG. 1.

Further, the position managing apparatus (Home Agent: HA) for performing positional management of mobile nodes in each network is comprised of a single apparatus. In the PMIP network as a network-based mobility network, a plurality of PMAs (Proxy Mobile Agents) serving as default routers for mobile nodes and forwarding packets to position managing apparatus are deployed. In the foreign network as a host-based mobility network, a plurality of ARs (Access Routers) serving as default routers and distributing addresses to be acquired at the connection points of mobile nodes are deployed.

In the drawings, a PMA 30 is provided in the PMIP network and an AR 10 is provided in the foreign network. Further, in the PMIP network, an HA 40 is provided as the position managing apparatus. Connected to the foreign network is a communication device to be the opposite end from the mobile node.

A mobile node 20 shown in FIG. 1 is assigned with "HoA(P1::MN1)" as its home address. It is also assigned with "CoA(P2::MN1)" as its care-of address when it connects to the foreign network.

Here, for description convenience, FIG. 1 shows only one AR 10, mobile node 20 and PMA 30 as each device, but multiple devices may, of course, be deployed.

Here, one example of the network-based mobility network may be a cellular network which a communication carrier that operates to connect cellular phones, a carrier's network for operating an ISP, or the like. Further, one example of the foreign network for supporting movement based on host-based mobility may be a WLAN, home network, or a carrier network operated by another carrier.

1.2 Mobile Node Configuration

Next, the configuration of mobile node 20 will be described. Mobile node 20 is a mobile terminal that makes simultaneous connection to a plurality of network accesses such as a cellular mobile terminal, PDA, etc. having mobile node functionality conforming to PMIPv6, MIPv6 and MCoA. It also has the function of establishing simultaneous connection to its home link which is a network-based mobility network and a foreign link which is a host-based mobility network.

Figures 2, 3:
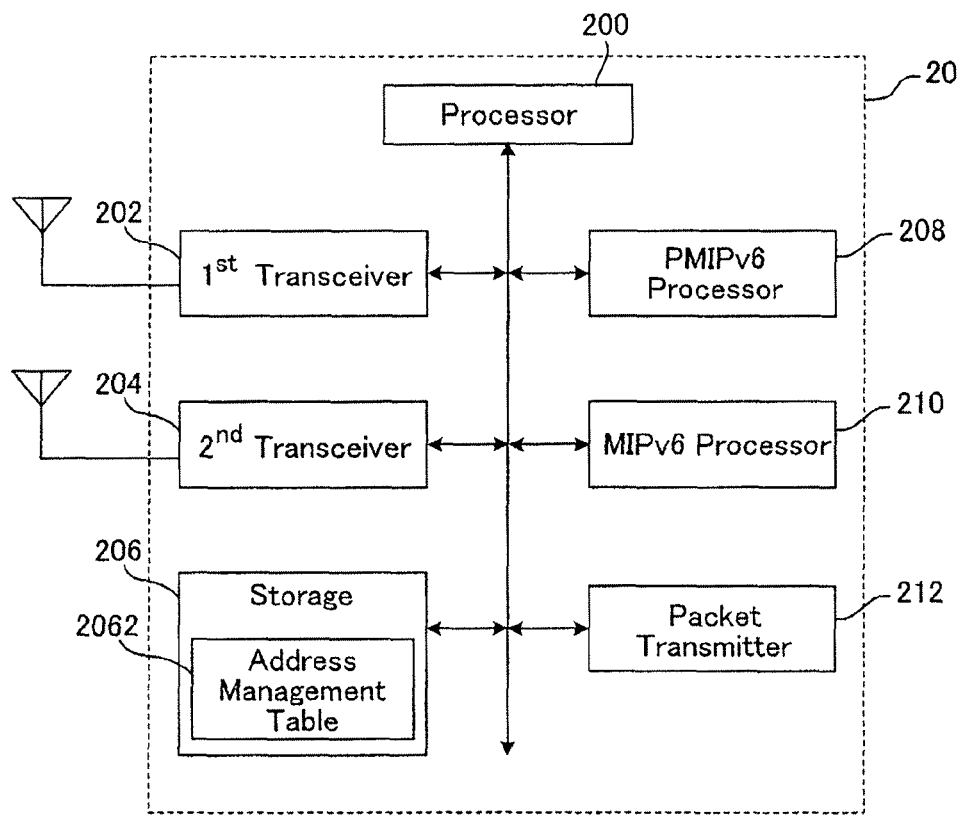
FIG. 2 A diagram showing one exemplary configuration of a mobile node.
FIG. 3 A diagram showing one example of the data structure of an address management table.

Here, mobile node 20 includes, as shown in FIG. 2, a processor 200, a first transceiver 202, a second transceiver 204, a storage 206, a PMIPv6 processor 208, an MIPv6 processor 210 and a packet transmitter 212.

Processor 200 is a functional part for controlling mobile node 20, or the functional part executing processes based on a predetermined program to transmit commands and data to diverse functional parts. For example, processor 200 is constructed of a CPU (Central Processing Unit) and the like.

First transceiver 202 and second transceiver 204 are each connected to an external antenna, and transceivers for establishing wireless connection to a network. The transceivers perform transmission and reception of packets via respective networks. As the wireless accessing technique for first transceiver 202 and second transceiver 204 to achieve wireless connection herein, any technology such as a wireless access system used in wireless LANs, cellular networks, a short-distance wireless access system such as Bluetooth (registered trademark) etc., and the like can be used.

Storage 206 is a functional part for storing various kinds of data and programs, in particular, includes an address management table 2062. Address management table 2062 is a table for storing default data for connection based on PMIPv6. It also stores the care-of address as connection information for connection to a foreign network based on MIPv6, the HA address and default router information.

Here, FIG. 3 shows one example of the data configuration of address management table 2062. Herein, an address as positional information, a default router and a position managing apparatus are stored in a related manner. For example, for the home address (HoA) "P1::MN1", "PMA 30" is associated as the default router for connection based on PMIPv6 and a care-of address (CoA)"P2::MN1" is associated to connect based on MIPv6. Further, for care-of address (CoA)"P2::MN1", "AR 10" is stored as the default router and "HA 40" is stored as the position managing apparatus.

Packet transceiver 212 selects either first transceiver 202 or second transceiver 204 based on address management table 2062 stored in storage 206 and sends out a packet therethrough. Further, it receives a received packet from each transceiver.

MIPv6 processor 210 is a functional part for performing an MIPv6 process when connection from the PMIP network to the foreign network is implemented. Further, PMIPv6 processor 208 is a functional part for performing transmission and reception of an attachment request and reply when connection to the PMIP network is performed.

1.3 PMA Configuration

Next, the configuration of a PMA 30 in the present embodiment will be described. PMA 30 is an apparatus constructed conforming to PMIPv6.

Figures 4, 5:
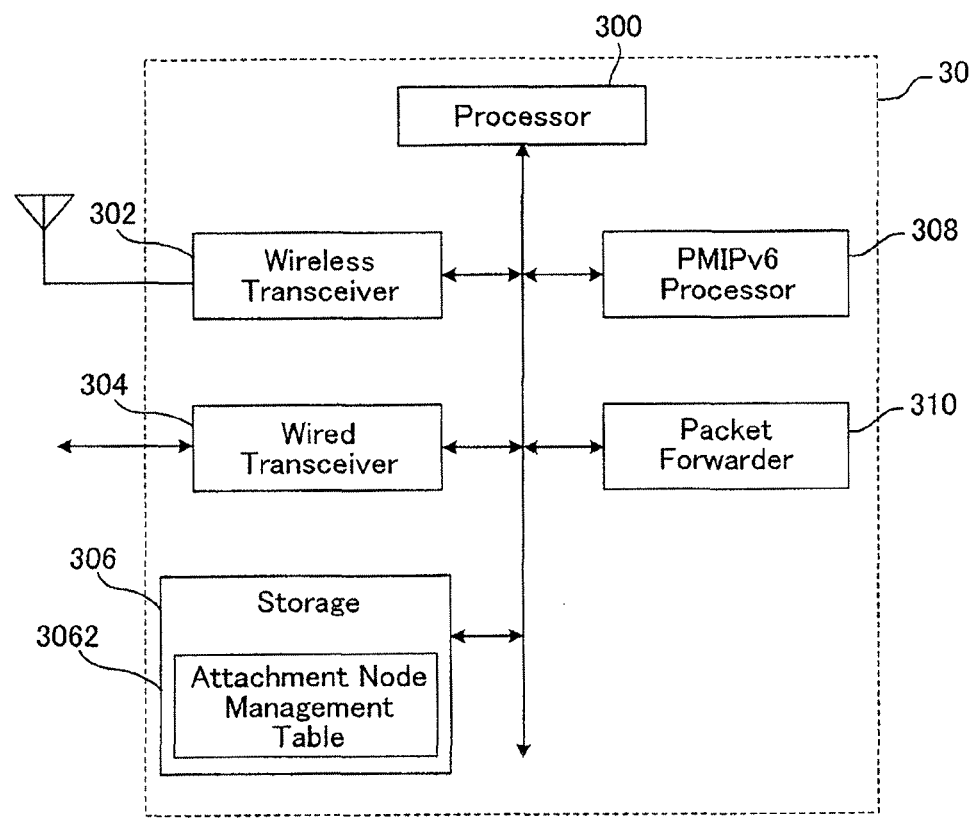
FIG. 4 A diagram showing one exemplary configuration of a PMA.
FIG. 5 A diagram showing one example of the data structure of an attachment node management table.

As shown in FIG. 4 PMA 30 includes a processor 300, a wireless transceiver 302, a wired transceiver 304, a storage 306, a PMIPv6 processor 308 and a packet forwarder 310. Further, an external antenna for communications is connected to wireless transceiver 302.

Processor 300 is a functional part for controlling PMA 30, or the functional part executing processes based on a predetermined program to transmit commands and data to diverse functional parts. For example, processor 300 is constructed of a CPU (Central Processing Unit) and the like.

Wireless transceiver 302 is a transceiver for establishing wireless connection to mobile node 20 and performs transmission and reception of packets. As the wireless accessing technique for wireless connection, any of a wireless LAN, a wireless access system used in cellular networks and a short-distance wireless access system such as Bluetooth (registered trademark) etc., can be used.

Wired transceiver 304 is a transceiver that is connected by wire to a router or a switch inside the PMIP network, and is a functional part for performing transmission and reception of packets. As the accessing technique for wired connection, widely used Ethernet (registered trademark) or the like can be used.

Storage 306 is a functional part for storing various kinds of data and programs, in particular, includes an attachment node management table 3062. Attachment node management table 3062 stores attachment mobile nodes and their correspondent forwarding positions (addresses).

Here, FIG. 5 shows one example of the data configuration of attachment node management table 3062. Herein, attachment nodes are stored in association with forwarding positions. For example, "mobile node 30" and the forwarding position of mobile node 30, "HoA(P1::MN1)" are stored in association with each other.

The forwarding designation of nodes that have not been registered in attachment node management table 3062 are registered as "the others". For example, in the case of FIG. 5, a packet of a node that has not been registered in attachment node management table 3062 will be forwarded to "HA 40".

PMIPv6 processor 308 is a functional part that notifies HA 40 of the identification information on mobile node 20 and the identification information on PMA 30. Further, the PMA registers into attachment node management table 3062 in storage 306 the fact that the mobile node has attached to itself. Further, the PMA makes a reply to the attachment request to the mobile node.

With this configuration, the mobile node can register its position to HA 40 when the mobile node has attached to PMA 30. Further, it is possible to determine the delivery address of the packet addressed to the attached mobile node.

Packet forwarder 310 is a functional part for forwarding packets based on attachment node management table 3062. For example, based on the attachment node management table 3062 shown in FIG. 5, a packet to mobile node 30 will be forwarded to the address of "HoA(P1::MN1)".

1.4 HA Configuration

Figures 6, 7:
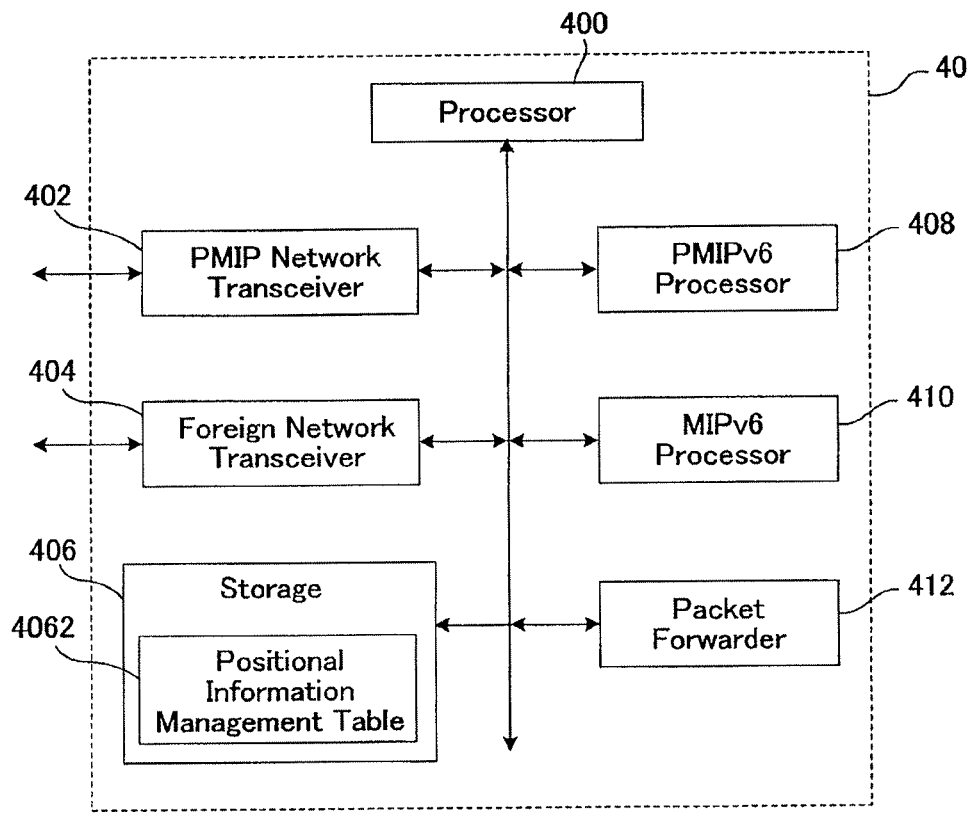
FIG. 6 A diagram showing one exemplary configuration of a position managing apparatus.
FIG. 7 A diagram showing one example of the data structure of a positional information management table.

Next, HA 40 in the present embodiment will be described. As shown in FIG. 6, HA 40 includes: a processor 400; a PMIP network transceiver 402 for connection to the PMIP network; a foreign network transceiver 404 for connection to a foreign network; a storage 406; a PMIPv6 processor 408; an MIPv6 processor 410; and a packet forwarder 412.

Processor 400 is a functional part for controlling HA 40, or the functional part executing processes based on a predetermined program to transmit commands and data to diverse functional parts. For example, processor 400 is constructed of a CPU (Central Processing Unit) and the like.

PMIP network transceiver 402 or foreign network transceiver 404 is a transceiver that is connected by wire to a router or a switch and performs transmission and reception of packets. As the accessing technique for wired connection, any of the technologies that are widely used in networks, such as Ethernet (registered trademark) and the like can be used.

Storage 406 is a functional part for storing various kinds of data and programs, in particular, includes a positional information management table 4062. Positional information management table 4062 stores a mobile node in association with the position (address) of the correspondent mobile node. Here, the MIPv6 positional information contains identification information on a mobile node and a care-of address gained on the foreign network to which the mobile node connects.

FIG. 7 shows one example of the data configuration of positional information management table 4062. As shown in FIG. 7, positional information management table 4062 stores a mobile node and the position (address) of the correspondent mobile node. For example, the position of mobile node 20 (HoA(P1::MN1)) is stored as to be PMA 30 and CoA(P2::MN1).

PMIPv6 processor 408 is a functional part that, when receiving a position registration signal from PMA 30, registers the positional information into positional information management table 4062 and transmits a reply to PMA 30. Further, MIPv6 processor 410 is a functional part that, when receiving a position registration signal from mobile node 20, registers the position into positional information management table 4062 and transmits a reply to mobile node 20.

The packet forwarder is a functional part for forwarding a packet based on positional information management table 4062 stored in storage 406. This controls packet forwarding via PMIP network transceiver 402 or foreign network transceiver 404.

2. Processing Flow

[2.1 Position Registering Procedure]
[2.1.1 System Flow]

Next, the updating processes of the positional information in mobile node 20, PMA 30, AR 10 and HA 40 in the network shown in FIG. 1 will be described using the drawings.

To begin with, the position registering procedure of mobile node 20 will be described based on the sequence diagram in FIG. 8. When detection connection to the PMIP network as a network-based mobility network, mobile node 20 makes an attachment request (procedure (a) in FIG. 8).

For example, mobile node 20, when it is started to operate, or power is turned on, sends an Association Request message for RRC (Radio Resource control) to PMA 30 to which it is going to attach, to make an attachment request. At this point, mobile node 20 receives announcing information from neighboring PMAs and selects PMA 30 based on the result of performing cell search. Specifically, the mobile node notifies the identification information for itself to be identified, such as the global IP address, MAC address or UE-ID defined by specifications such as 3GPP TS23.003V5.2.0, by the Association Request message so as to make an attachment request.

In PMA 30, wireless transceiver 302 receives the Association Request and registers the identification information of mobile node 20 and the fact that mobile node 20 has attached to PMA 30, into attachment node management table 3062 of storage 306.

Figure 8:
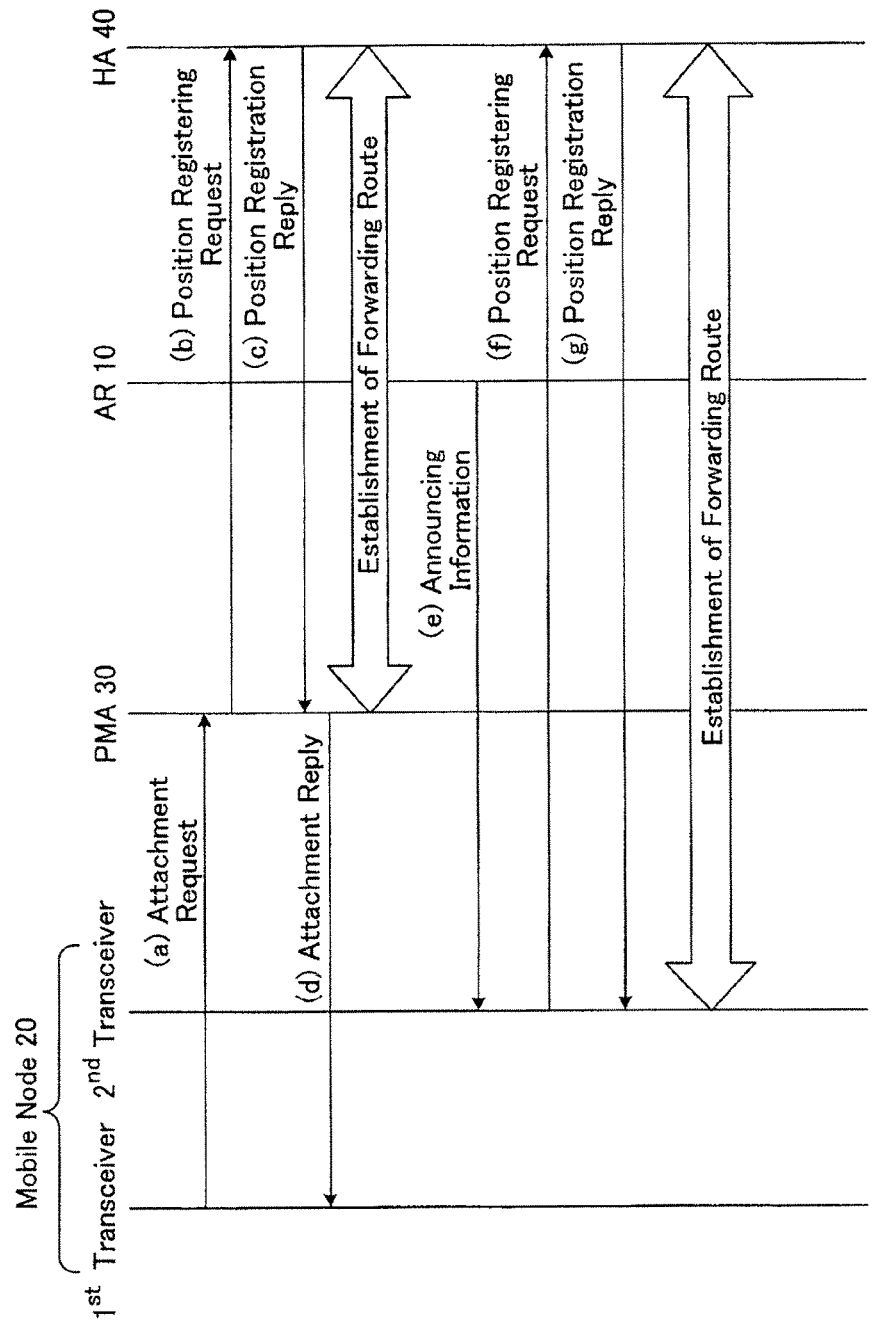
FIG. 8 A sequence diagram in a position registering process.

PMA 30 solves HA 40 at the destination to register based on the attachment request from mobile node 20 and transmits a position registering request to HA 40 (procedure (b) in FIG. 8). The method of solving HA 40 may be acquired from the apparatus for managing the correspondence between mobile node 20 and HA 40, such as an AAA server etc., to which PMA 30 is connected, for example, or it is possible to solve it by storing the receiver management table that previously holds management information of the correspondence between mobile node 20 and HA 40 into storage 306, in advance.

Specifically, PMA 30 notifies the identification information for identifying mobile node 20, such as the global IP address, MAC address or UE-ID, and an IP address for identifying PMA 30 that can be routed inside the PMIP network, as the positional information.

HA 40 receives the position registering request from PMA 30, and registers the identification information of mobile node 20 associated to its positional information into positional information management table 4062. The reply message includes the global IP address to be assigned to mobile node 20, or network prefix information of the global IP address to be assigned to the mobile node.

When HA 40 registers the information on mobile node 20 into positional information management table 4062, then it transmits a position registration reply to PMA 30 (procedure (c) in FIG. 8).

PMA 30, as receiving the reply from HA 40, registers into attachment node management table 3062 the forwarding destination of the packet transmitted from mobile node 20 to be the HA and so that a packet addressed to the mobile node will be delivered to the mobile node.

PMA 30 makes a response to the attachment request from mobile node 20 using RCC Association Response message or the like to the mobile node (procedure (d) in FIG. 8). The reply to the attachment request includes identification information such as the IP address or MAC address of PMA 30 so that mobile node 20 can set PMA 30 as the default router.

Mobile node 20 receives the attachment reply from first transceiver 202 and registers PMA 30 as the attachment destination into address management table 2062. This identification information on PMA 30 does not need to be identical with the identification information on PMA 30 registered in HA 40. For example, the IP address notified to HA 40 is the IP address to be used for routing within the PMIP network, whereas the IP address notified to the mobile node is the IP address which the mobile node identifies as the default router.

As above, mobile node 20 performs connection to the PMIP network network, in accordance with the procedures defined by PMIPv6. Further, a forwarding route is established between PMA 30 and HA 40, so that mobile node 20 can perform communications by way of the forwarding route established in the PMIP network.

Next, mobile node 20, while keeping connection to the PMIP network, performs connection to the foreign network using another transceiver.

Mobile node 20 makes another transceiver or second transceiver 204 receive announcing information from the access router (AR 10) on the network connected to it, to detect connection to the foreign network (procedure (e) in FIG. 8). Here, the announcing information transmitted from AR 10 is IPv6 router announcing information or the like, including information on the network prefix of the connected network in addition to the MAC address and IP address of the access router.

Mobile node 20 generates its care-of address based on the network prefix information of the connected network of the received announcing information and transmits a position registering request to HA 40 (procedure (f) in FIG. 8). The position registering request to be transmitted should include identification information of the mobile node such as the home address, MAC address or UE-ID etc., and the care-of address to be the positional information.

HA 40 receives the position registering request from mobile node 20 and registers it into positional information management table 4062. Registered into positional information management table 4062 is identification information of the mobile node such as the home address, MAC address or UE-ID etc., of mobile node 20 in association with the positional information, i.e., the care-of address. As the aforementioned positional information management table 4062, the same one that is used at the time of position registration in the PMIP network may be used. As a result, HA 40 can handle mobile node 20 having a single home address by managing a plurality of positional information at the same time, the care-of address as the positional information in the foreign network and PMA 30 as the positional information in the home link or the PMIP network.

HA 40, after registration into positional information management table 4062, transmits a position registration reply to mobile node 20 (procedure (g) in FIG. 8).

Mobile node 20 receives the position registration reply from HA 40 and manages the care-of address or home address and the address of HA 40 as the position managing apparatus, with address management table 2062.

In the example where conventional PMIPv6 and MIPv6 are combined, in HA 40, when a position registering request based on MIPv6 as shown in procedure (f) in FIG. 8 is received in the state where PMIPv registration is being performed, the positional information of PMIPv6 as the home link is deleted and the positional registration based on the MIPv6 request is performed. Specifically, when the position registering request by procedure (f) in FIG. 8 is received, the positional information of the PMIP network in positional information management table 4062 is deleted and the positional information based on MIPv6 is registered.

In the HA 40 in the present embodiment, the positional information of the PMIP network and the positional information based on the MIPv6 are registered simultaneously in the positional information management table.

That is, it is the conventional practice that when HA 40 that manages connection to the home link as the PMIP network receives a connection request from the foreign link, the HA cuts connection to the home link and permits connection to the foreign link. However, the HA 40 of the present embodiment manages both the connection information without cutting connection to the home link.

Also, in the example where conventional PMIPv6 and MIPv6 are combined, when position registration is performed in mobile node 20 based on MIPv6 by means of another transceiver in the state where the mobile node is being connected to the PMIP network, the information on connection to the PMIP network is deleted at the time of position registering, then position registration is performed from the foreign network based on MIPv6. Specifically, when the information on the attachment to the PMIP network is deleted in address management table 2062, and a position registering request is transmitted to HA 40. However, in the present embodiment, mobile node 20 holds the position registration information for both the PMIP network and the foreign network at the same time. That is, both the information of attachment to the PMIP network and the information of registration to HA 40 using the care-of address obtained through the foreign network will be registered at the same time.

Accordingly, mobile node 20 connected to the packet communication system in the present embodiment will perform positional registration from the foreign link without cutting off the connection with the home link to manage both connection information.

In the state where mobile node 20 is being connected to the PMIP network, HA 40 which has received the positional registration to the foreign network can keep both the positional information on the home link and on the foreign link. However, in order to permit disconnection from the home link as in the conventional manner when a request for connection to the foreign link is made, information that indicates either disconnection or simultaneous connection may be newly included to the position registration information in the foreign link, whereby it is possible for HA 40 to determine whether HA 40 manages a plurality of positional information for the mobile node or whether it deletes the holding information and performs new registration, in accordance with the request from mobile node 20.

Specifically, the position registering request in procedure (f) in FIG. 8 is added with a flag and is transmitted. Here, the flag is to be used to determine whether the connection information in the home link should be deleted.

Similarly, in the case where, while the mobile node is being connected from a foreign link based on MIPv6, it makes a request for attachment to the PMIP network to perform position registering to HA 40 through PMA 30, HA 40 can perform a plurality of position registration in accordance with the request from PMA 30 as stated above. However, it is also possible to cut off the connection to the foreign link and establish connection to the home link as performed conventionally.

Accordingly, mobile node 20 transmits an attachment request including the information that shows either cutoff or simultaneous connection, to PMA 30. Further, PMA 30 transmits a position registering request including the information indicating whether the cutoff has been done or simultaneous connection is being established, to HA 40. HA 40 is able to determine whether it manages a plurality of positional information for mobile node 20 or whether it deletes the holding information and performs new registration, in accordance with the request from mobile node 20.

Specifically, the attachment request in procedure (a) in FIG. 8 is added with a flag and is transmitted. This flag is used to determine whether the connection information on the foreign network should be deleted. In procedure (b) in FIG. 8, PMA 30 adds the flag included in the attachment request to the position registering request to be transmitted to HA 40 and sends it.

Though the present embodiment was described taking an example in which connection to the foreign network is achieved after connection with the PMIP network, it goes without saying that connection to the PMIP network may be achieved after connection with the foreign network.

[2.1.2 Mobile Node's Processing Flow]

Figure 9:
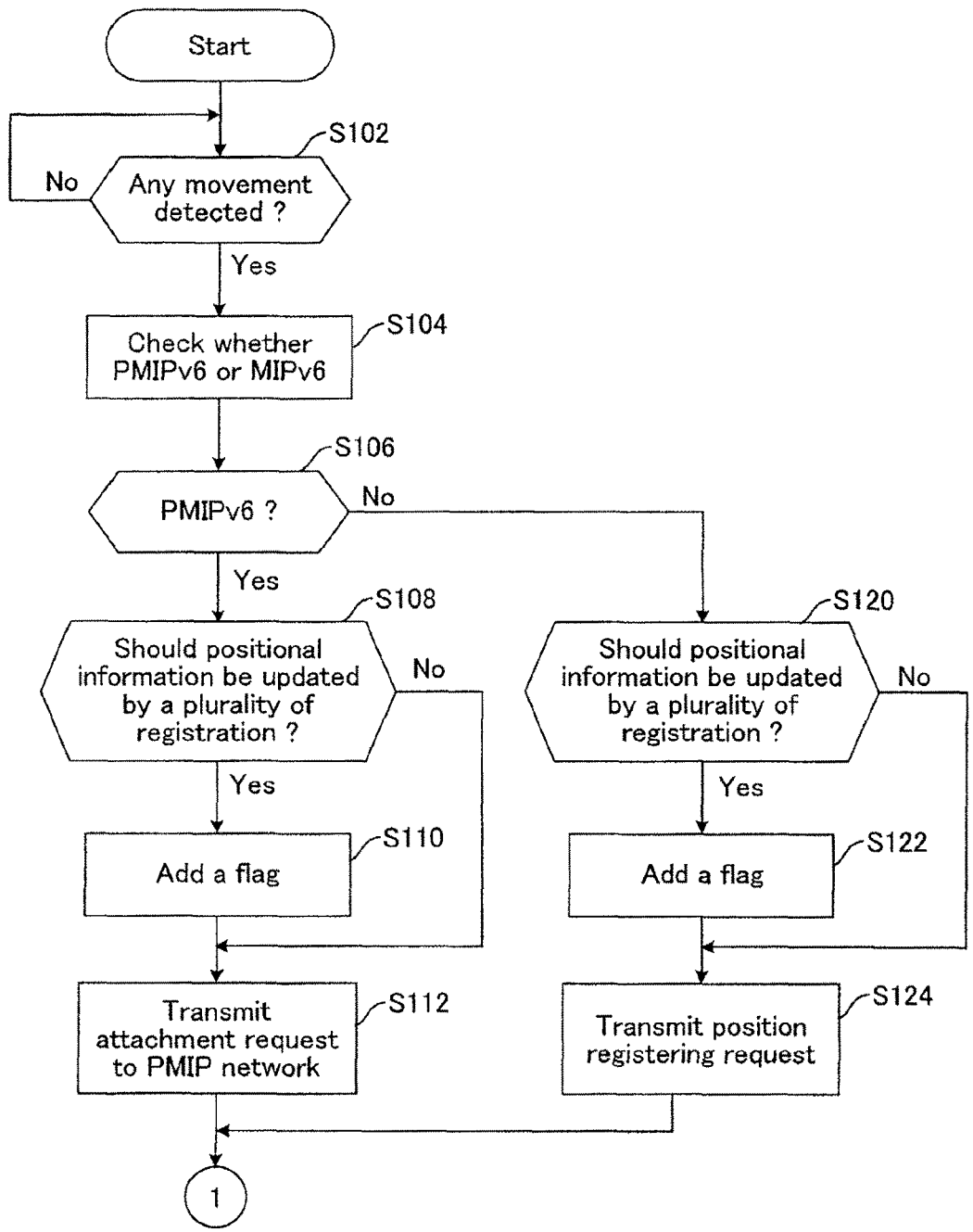
FIG. 9 An operation flow chart showing the operation of a mobile node.
Figure 10:
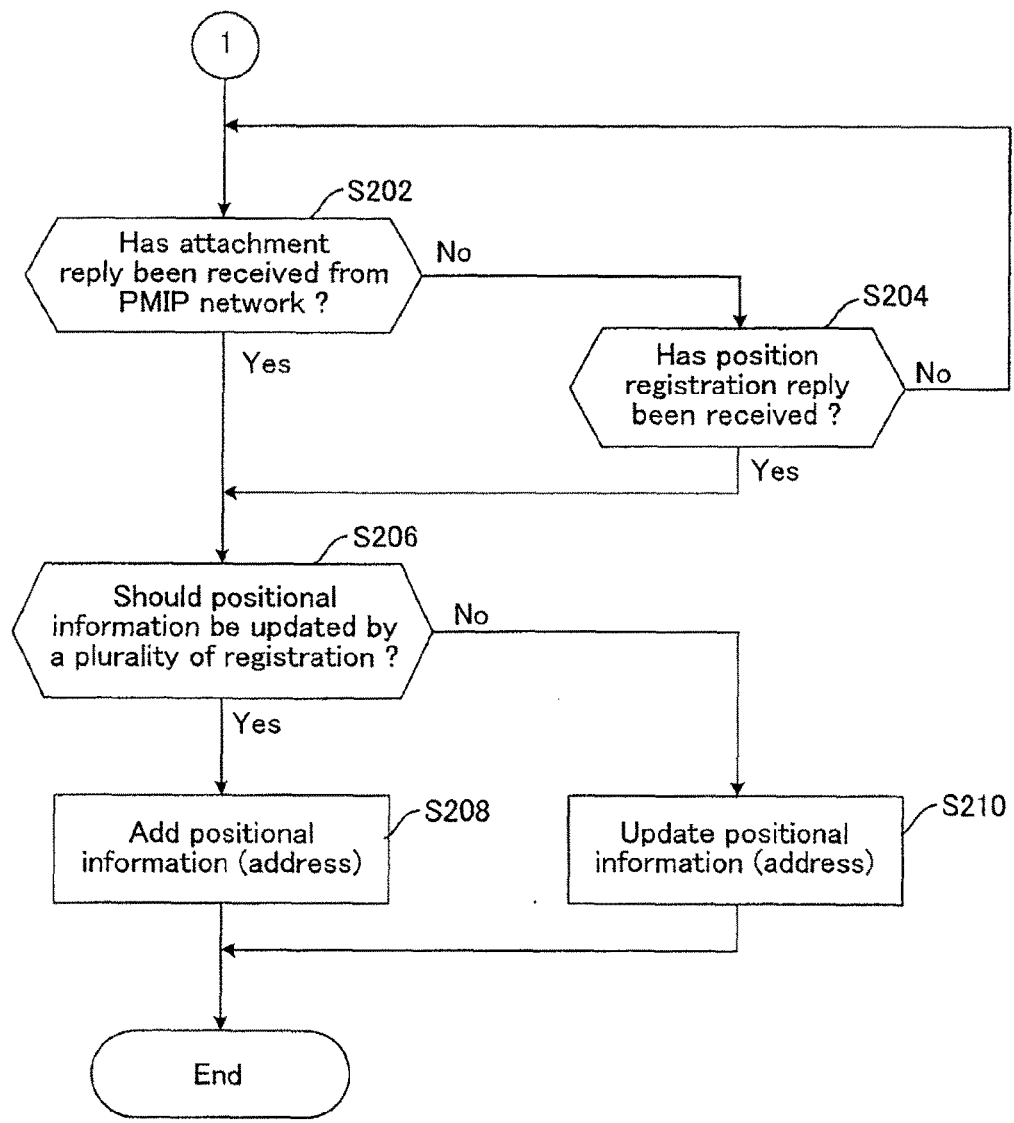
FIG. 10 An operation flow chart showing the operation of a mobile node.

Next, the operation of mobile node 20 in the position registering procedure will be described using an operation flow. First, FIGS. 9 and 10 are charts for illustrating the process related to position registering at mobile node 20.

When mobile node 20 detects the fact that it has moved from one network to another (Step S102; Yes), it is checked whether the packet received at the time of detection is one based on PMIPv6 or one based on MIPv6 (Step S104).

Herein, when it is determined that the received packet is one that is based on PMIPv6 (Step S106; Yes), it is checked whether updating should be done by registering a plurality of positional information (Step S108).

Here, if updating is performed by registering the plurality of positional information (Step S108; Yes), a flag that indicates that updating needs to be done by the plurality of registration is added (Step S110). Then, an attachment request to the PMIP network is transmitted to PMA 30 (Step S112).

On the other hand, when it is determined that the packet detected at the time of detection of movement is one that is not based on PMIPv6 (Step S106; No), it is determined that the packet is one based on MIPv6. Further, if updating is performed by registering the plurality of positional information (Step S120; Yes), a flag that indicates that updating needs to be done by the plurality of registration is added (Step S122). Then, a position registering request for the position in the foreign network is transmitted to HA 40 (Step S124).

Subsequently, it is checked whether there has been reception of an attachment reply from the PMIP network or PMA 30 (Step S202) or whether there has been reception of a reply based on MIPv6 from HA 30 (Step S204).

Herein, when reception of an attachment reply has been received (Step S202; Yes/procedure (d) in FIG. 8) or when reception of a position registration reply has been received (Step S202; No→Step S204; Yes/procedure (g) in FIG. 8), it is checked whether the received attachment reply reception or position registration reply reception includes the flag so as to determine whether a plurality of positional information (addresses) are registered (Step S206). Here, if it has been determined that updating is performed by registering the plurality of positional information (addresses) thanks to inclusion of the flag (Step S206; Yes), positional information (address) is added to address management table 2062. On the other hand, if it has been determined that updating is not performed by registering the plurality of positional information (addresses) thanks to non-inclusion of the flag (Step S206; No), positional information (address) in address management table 2062 is updated and stored.

[2.1.3 HA's Processing Flow]

Figure 11:
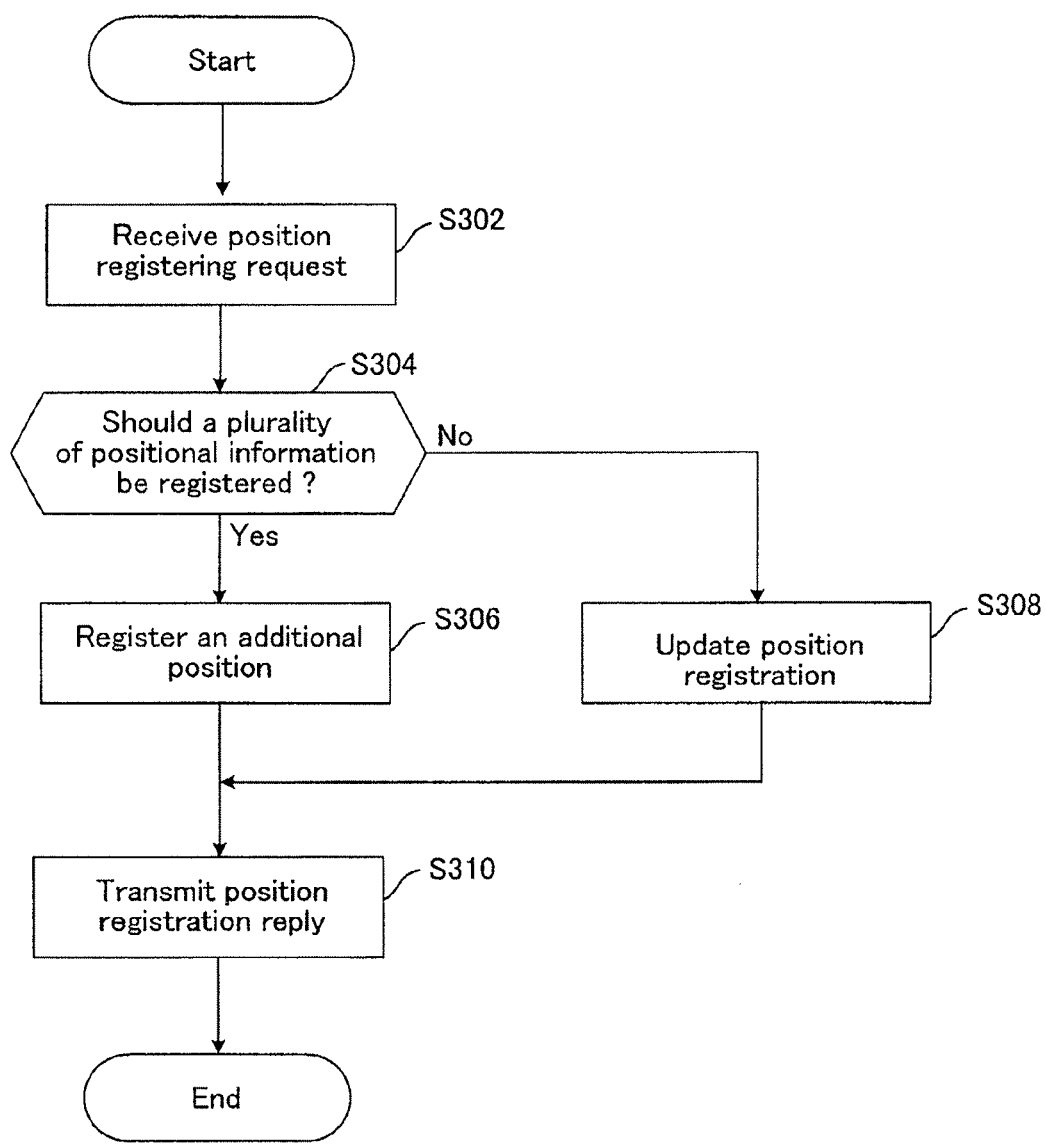
FIG. 11 An operation flow chart showing the operation of a position managing apparatus.

Next, the operation of HA 40 when a mobile node is registered will be described using an operation flow in FIG. 11.

First, HA 40 receives a position registering request (Step S302). Here, there are cases in which the position registering request is demanded from PMA 30 (procedure (b) in FIG. 8) and in which it is demanded from mobile node 20 (procedure (f) in FIG. 8).

Next, HA 40 determines whether it is necessary to register a plurality of positional information that is demanded to be registered (Step S304). That is, it is determined whether there is the predetermined flag in the position registering request signal. If there is the flag, it is determined that the plurality of positional information should be registered, so that the position is additionally registered into positional information management table 4062 (Step S304; Yes→Step S306). On the other hand, if there is no flag in the position registering request signal, the positional information stored in positional information management table 4062 is updated (Step S304; No→Step S308).

When completing position registering, HA 40 transmits a position registration reply (Step S310). Here, the position registration reply is transmitted to PMA 30 (procedure (c) in FIG. 8) and mobile node 20 (procedure (g) in FIG. 8).

[2.2 Packet Forwarding Procedure]

[2.2.1 System Flow]

Figure 12:
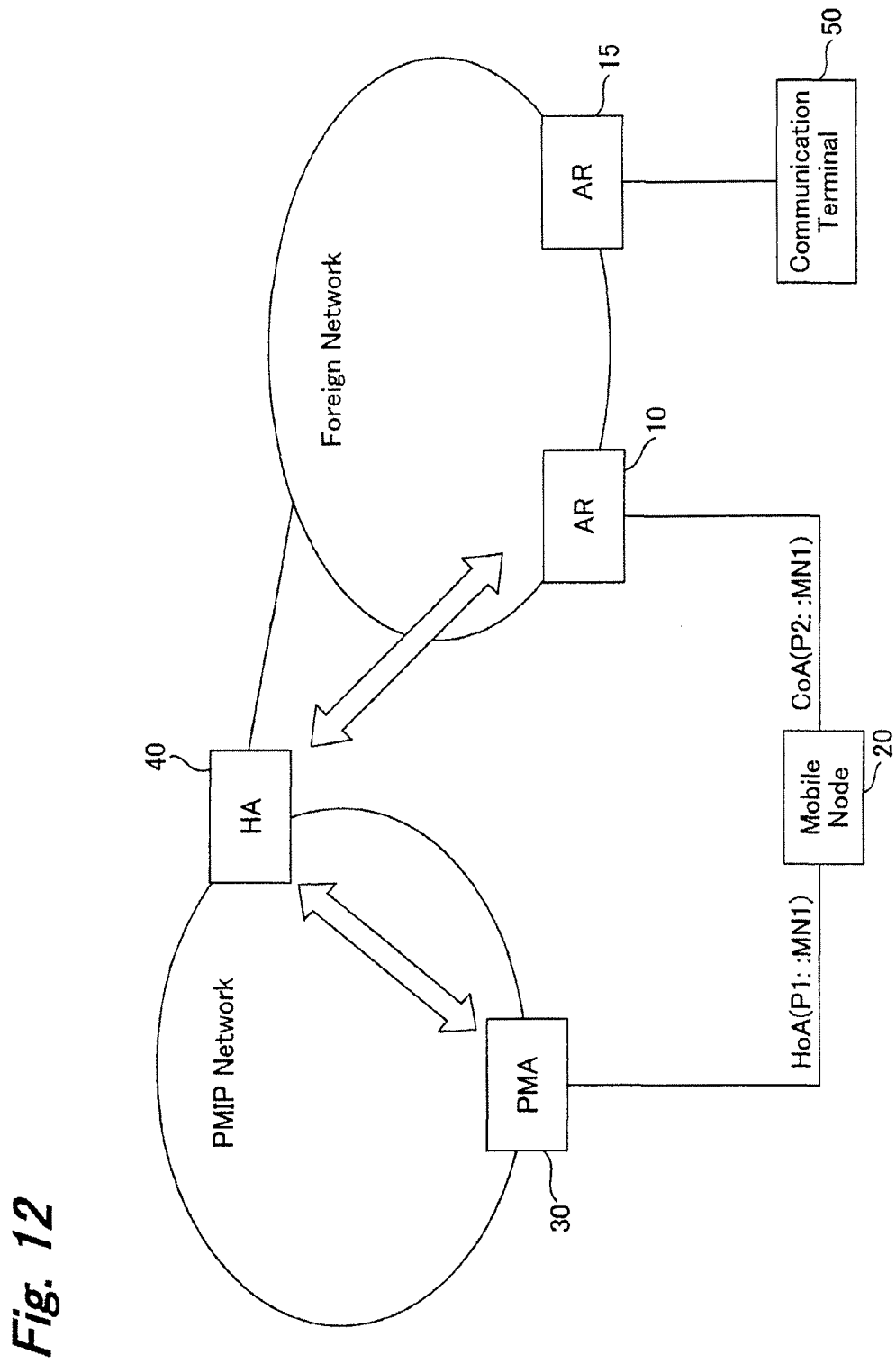
FIG. 12 A diagram showing the scheme of a communication system.

Next, communication between mobile node 20 connected to the PMIP network and a foreign network and a communication terminal 50 connected to the foreign network will be described using the drawings. FIG. 12 is a diagram showing the scheme of a mobile communication system. As described heretofore, mobile node 20 includes a plurality of transceivers, one connecting to the PMIP network and the other to the foreign link. The PMIP network is the home link for mobile node 20, and movement of mobile node 20 changing PMAs inside PMIP network is done based on PMIPv6. On the other hand, the node is connected to the foreign network by the other transceiver, and movement of the node by changing ARs in the foreign network is done based on MIPv6. Position registering for simultaneous use to both is realized in the method described above.

Figure 13:
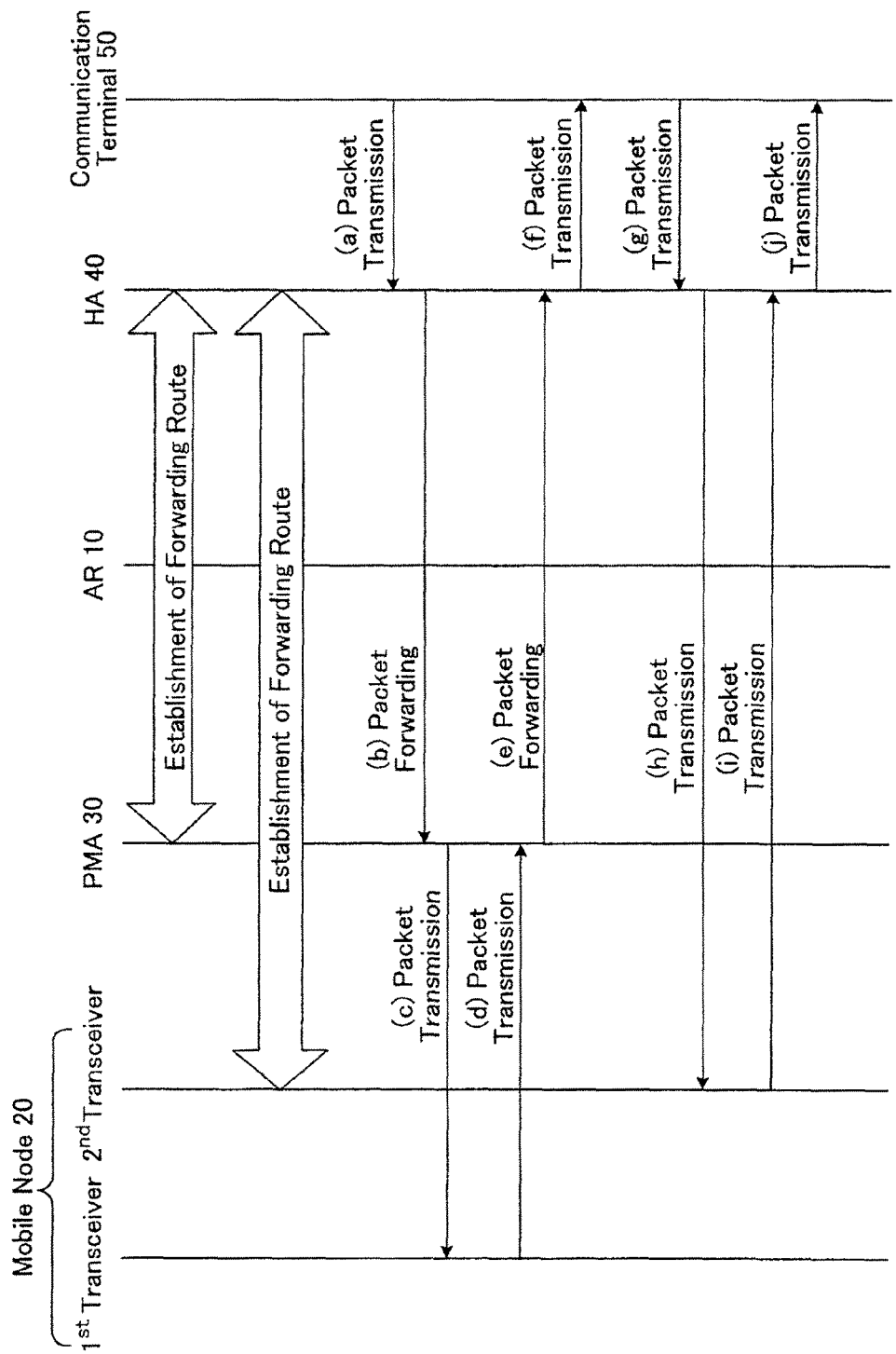
FIG. 13 A sequence diagram showing packet forwarding.
Figure 14:
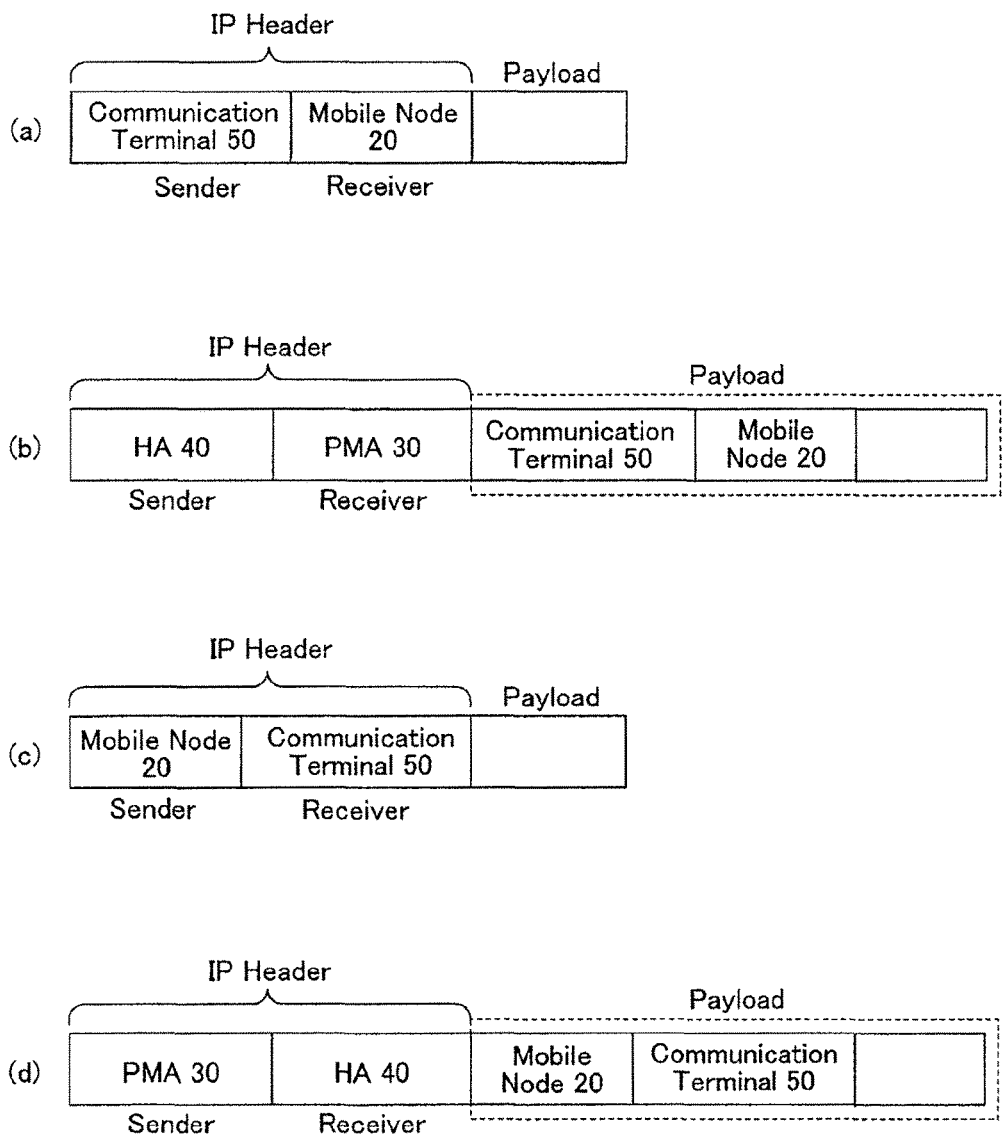
FIG. 14 A diagram showing one example of a packet format.

First, the sequence diagram in FIG. 13 is a chart for illustrating the overall flow of the packet forwarding procedure. FIG. 14 is a diagram schematically showing how packets are forwarded.

To begin with, a forwarding route has been established between PMA 30 and HA 40. This forwarding route is a forwarding path by way of the PMIP network. Established further between HA 40 and mobile node 20 is a forwarding route by way of AR 10. This forwarding route is a forwarding path by way of the foreign network.

Though in the present embodiment, the process of a case in which a packet is transmitted from communication terminal 50 to mobile node 20 and a reply to it is made will be described, it is of course possible to similarly handle the case in which a packet is transmitted from mobile node 20 to communication terminal 50.

(Packet Forwarding Through PMIP Network)

First, a case where a packet is forwarded by way of the PMIP network will be described. When a packet is transmitted from communication terminal 50 to mobile node 20, the packet is transmitted to HA 40 (procedure (a) in FIG.

13). At this point, the sender in the IP header of the packet is "communication terminal 50" and the receiver is "mobile node 20" (FIG. 14(a)).

In this case, HA 40 is the point of connection between the PMIP network and the foreign network, and is the only gateway router that announces the routing information on the home network prefix of the mobile node. Specifically, HA 40 announces the routing information to the foreign network so that any packet addressed to the home prefix of the mobile node can be delivered to itself, and any packet addressed from the communication terminal connected to the foreign network to the mobile node is delivered to HA 40.

HA 40 determines whether the packet is forwarded by way of the PMIP network or by way of the foreign network, and forwards the packet. Herein, if the packet is assumed to be forwarded through the PMIP network, the packet is forwarded to PMA 30 (procedure (b) in FIG. 13). At this point, the sender in the IP header of the forwarded packet is "HA 40" and the receiver is "PMA 30" (FIG. 14(b)). The packet data shown in FIG. 14(a) is stored as the payload. Then PMA 30 transmits the packet received from HA 40 to the receiver or mobile node 20 (procedure (c) in FIG. 13).

Next, when a packet is transmitted from mobile node 20 to communication terminal 50, the packet is transmitted to PMA 30 first (procedure (d) in FIG. 13). At this point, the sender in the IP header of the transmitted packet is "mobile node 20" and the receiver is "communication terminal 50" (FIG. 14(c)).

Subsequently, PMA 30 forwards the packet data received from mobile node 20 to HA 40 (procedure (e) in FIG. 13). At this point, the sender in the IP header of the forwarded packet is "PMA 30" and the receiver is "HA 40" (FIG. 14(d)). The packet data shown in FIG. 14(c) is stored as the payload. Then HA 40 transmits the received packet to communication terminal 50 (procedure (f) in FIG. 13).

(Packet Forwarding Through Foreign Network)

Figure 15:
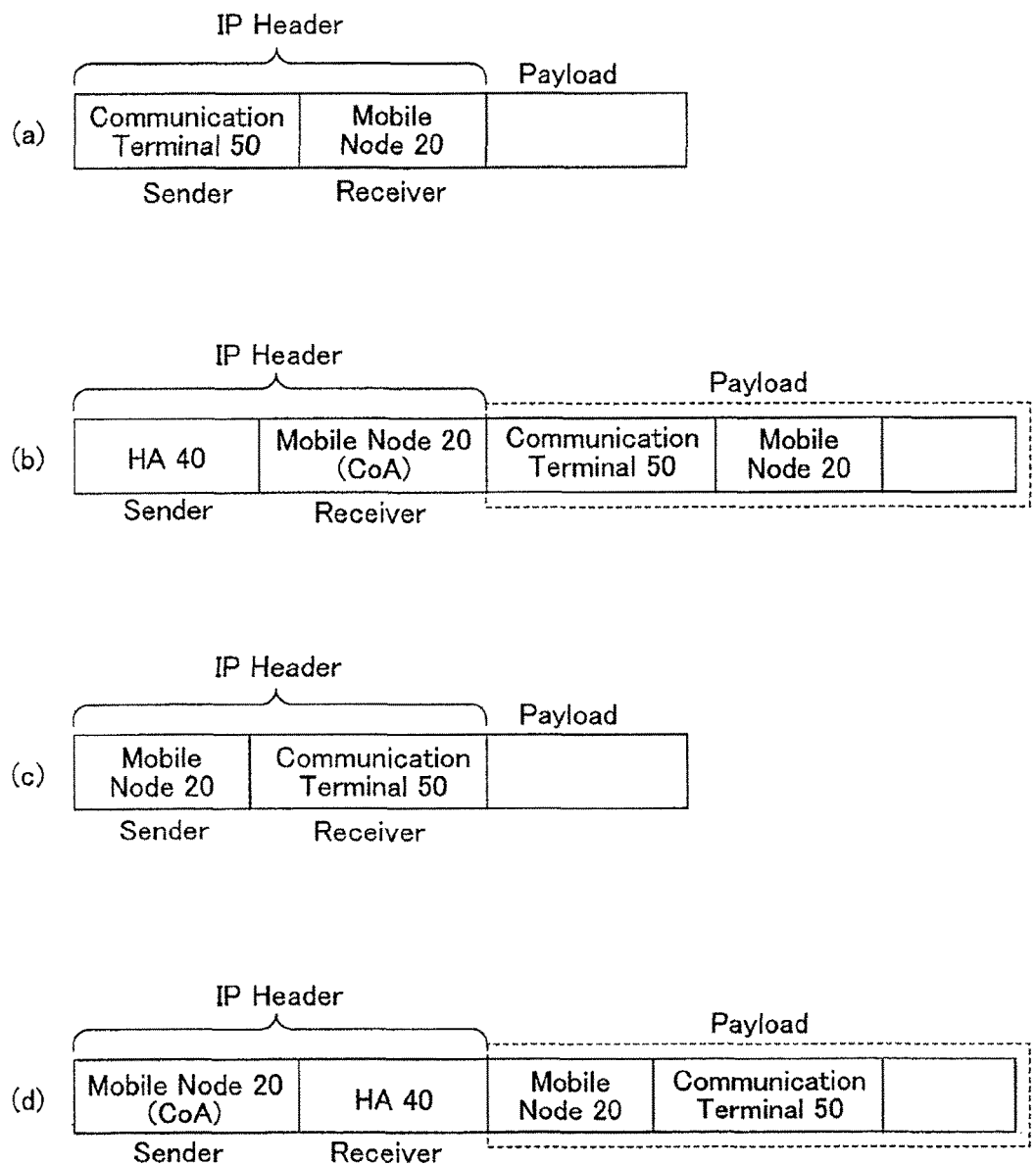
FIG. 15 A diagram showing one example of a packet format.

Next, a case where a packet is forwarded by way of a foreign network will be described. When a packet is transmitted from communication terminal 50 to mobile node 20, the packet is transmitted to HA 40 (procedure (g) in FIG. 13). At this point, the sender in the IP header of the packet is "communication terminal 50" and the receiver is "mobile node 20" (FIG. 15(a)).

Then, HA 40 determines whether the packet is delivered by way of the PMIP network or by way of the foreign network, and forwards the packet. Herein, if the packet is assumed to be forwarded through the foreign network, the packet is transmitted to mobile node 20 by way of AR 10 (procedure (h) in FIG. 13). At this point, the sender in the IP header of the transmitted packet is "HA 40" and the receiver is "mobile node 20". Here, a care-of address (CoA) is set for mobile node 20.

Next, when a packet is transmitted from mobile node 20 to communication terminal 50, the packet is transmitted to HA 40 first by way of AR 10 (procedure (i) in FIG. 13). At this point, the sender in the IP header of the transmitted packet is "mobile node 20" and the receiver is "communication terminal 50" (FIG. 15(c)), but when it is sent to HA 40, the original IP packet is stored as the payload. That is, the packet is transmitted by setting the care-of address (CoA) of "mobile node 20" as the sender and HA 40 as the receiver. Then, HA 40 transmits the received packet to communication terminal 50 (procedure (j) in FIG. 13).

[2.2.2 Mobile Node's Processing Flow]

Figure 16:
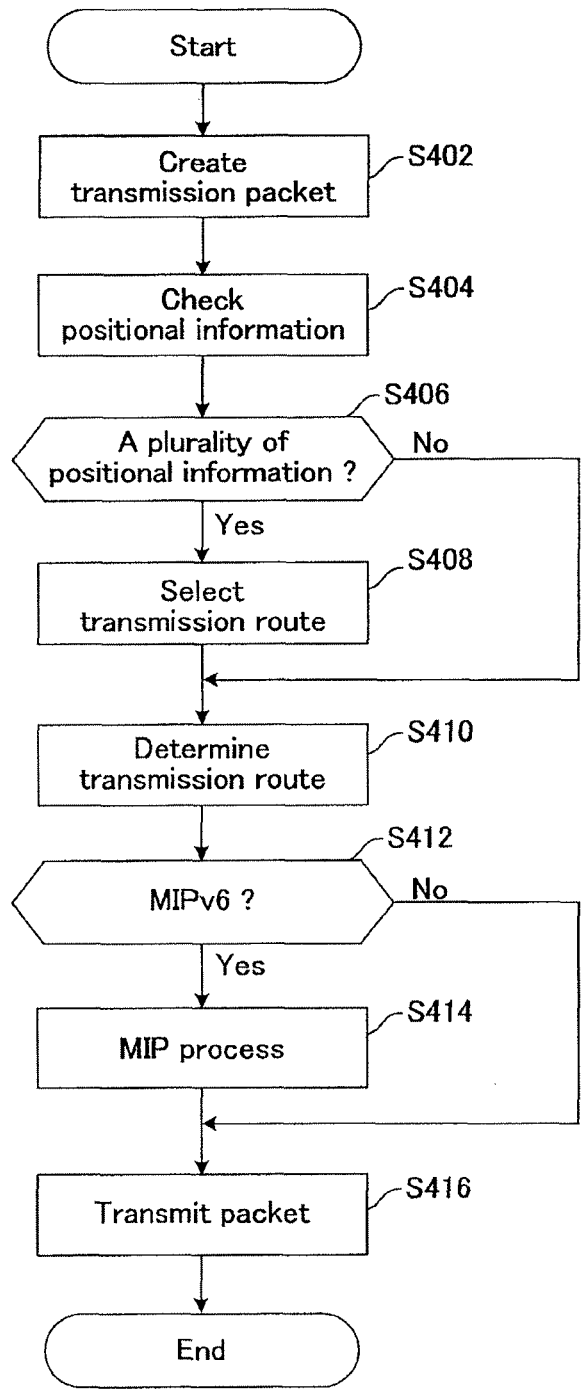
FIG. 16 An operation flow chart showing the operation of a mobile node.

Next, the operation of mobile node 20 in the packet forwarding procedure will be described using an operation flow. FIG. 16 is a chart for illustrating the process when a packet in mobile node 20 is transmitted.

First, in mobile node 20, packet transmitter 212 creates a transmission packet (Step S402). Here, processor 200 checks the positional information stored in address management table 2062 (Step S404). In this case, when a plurality of positional information have been registered in address management table 2062 (Step S406; Yes), one transmission route is selected based on the positional information among them (Step S408).

Then, a transmission route is determined from the selected transmission route or one transmission route defined as the positional information (Step S406; No)(Step S410). At this point, if transmission is carried out based on MIPv6 (Step S412; Yes), the packet is subjected to an MIPv6 process and then transmitted (Step S414). As the method for determining a transmission route at Step S410, a method of determining it using the routing protocol based on prefixes can be considered as an example.

[2.2.3 HA's Processing Flow]

Figure 17:
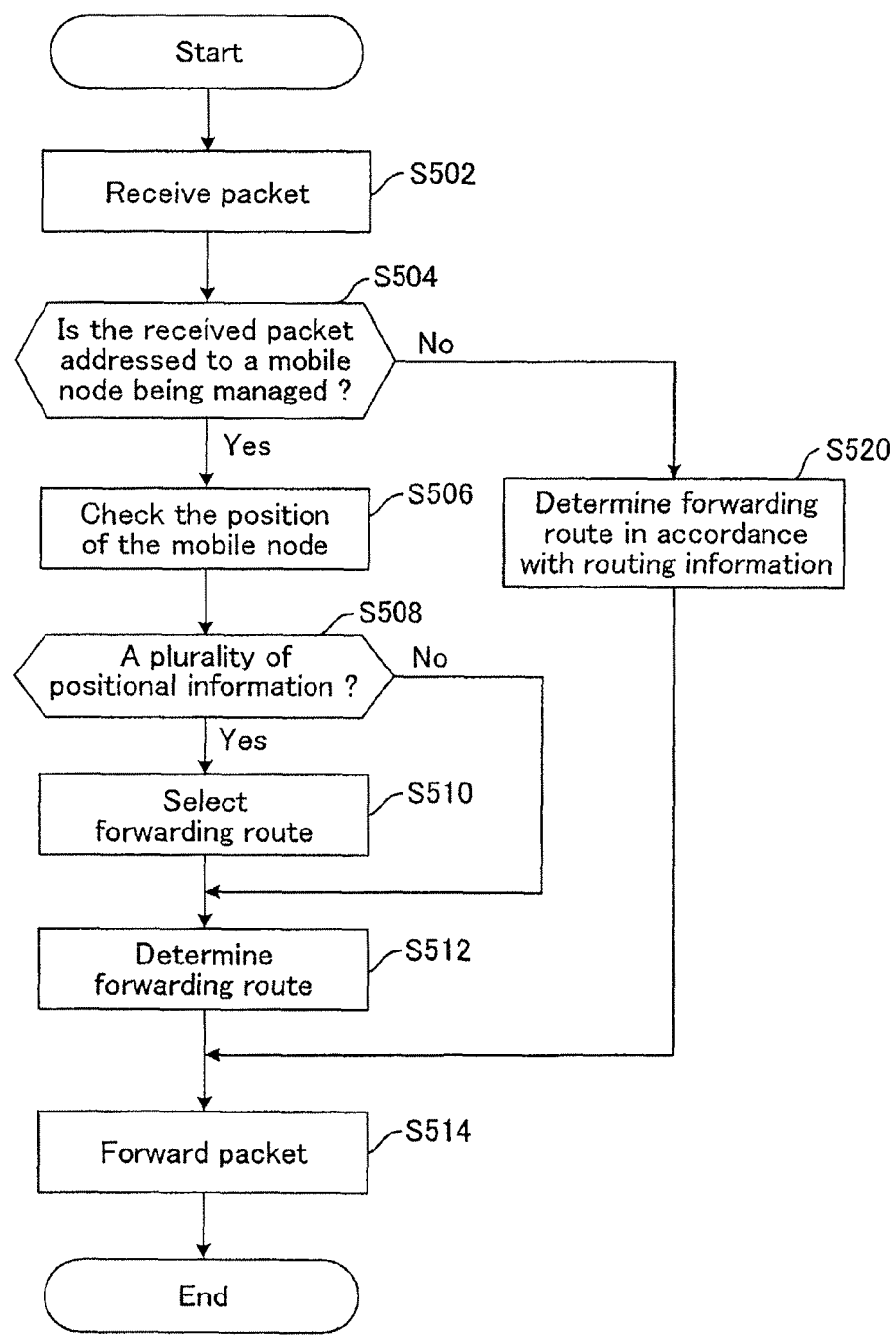
FIG. 17 An operation flow chart showing the operation of a position managing apparatus.

Next, the operation of HA 40 in the packet forwarding procedure will be described using an operation flow. FIG. 17 is a chart for illustrating the process when a packet is forwarded in HA 40.

First, the packet is received by PMIP network transceiver 402 or foreign network transceiver 404 of HA 40 (Step S502). At this point, processor 400 determines whether the receiver of the received packet is addressed to a mobile node that the HA 40 manages (Step S504).

If the packet is addressed to a mobile node that the HA 40 manages (Step S504; Yes), it checks the position of mobile node 20 (Step S506). At this point, if a plurality of positional information on mobile node 20 have been registered in positional information management table 4062 (Step S508; Yes), the forwarding route is selected based on one of the positional information (Step S510). Then, the HA determines a forwarding route (Step S512) based on the selected forwarding route or the one forwarding route defined as the positional information (Step S508; No) so as to forward the packet (Step S514). As the method for determining a transmission route at Step S410, a method of determining it using the routing protocol in the network can be considered as an example.

As described heretofore, according to the present embodiment, mobile node 20 includes a plurality of transceivers so that it is possible to connect to the PMIP network as the home link through one transceiver and connect to a foreign network through the other transceiver at the same time. For the identifier of a single mobile node 20, HA 40 manages PMA 30 as its positional information on the PMIP network, and at the same time, manages its care-of address on the foreign network as the foreign network positional information.

As a result, it is possible to establish a plurality of communication routes for a mobile node, hence select and use them depending on the preferences of the communication terminal at the communication partner side, communication data and the like.

3. Application Example

Application of the present invention enables construction of a large-scale PMIP network operated by a carrier or the like as its home link while permitting mobile node 20 to connect the carrier network and a WLAN as a hot spot or the like at the same time. Further, the mobile node can perform communications using a single IP address in both networks.

As a result, it is possible for the carrier, for example to achieve control such that an application that the carrier wants to be communicated through its own PMIP network is communicated by way of the PMIP network while an application that is regarded to be able to achieve a higher throughput if it is distributed through access networks such as WLAN etc., is entrusted to communication by way of a foreign network.

Figure 18:
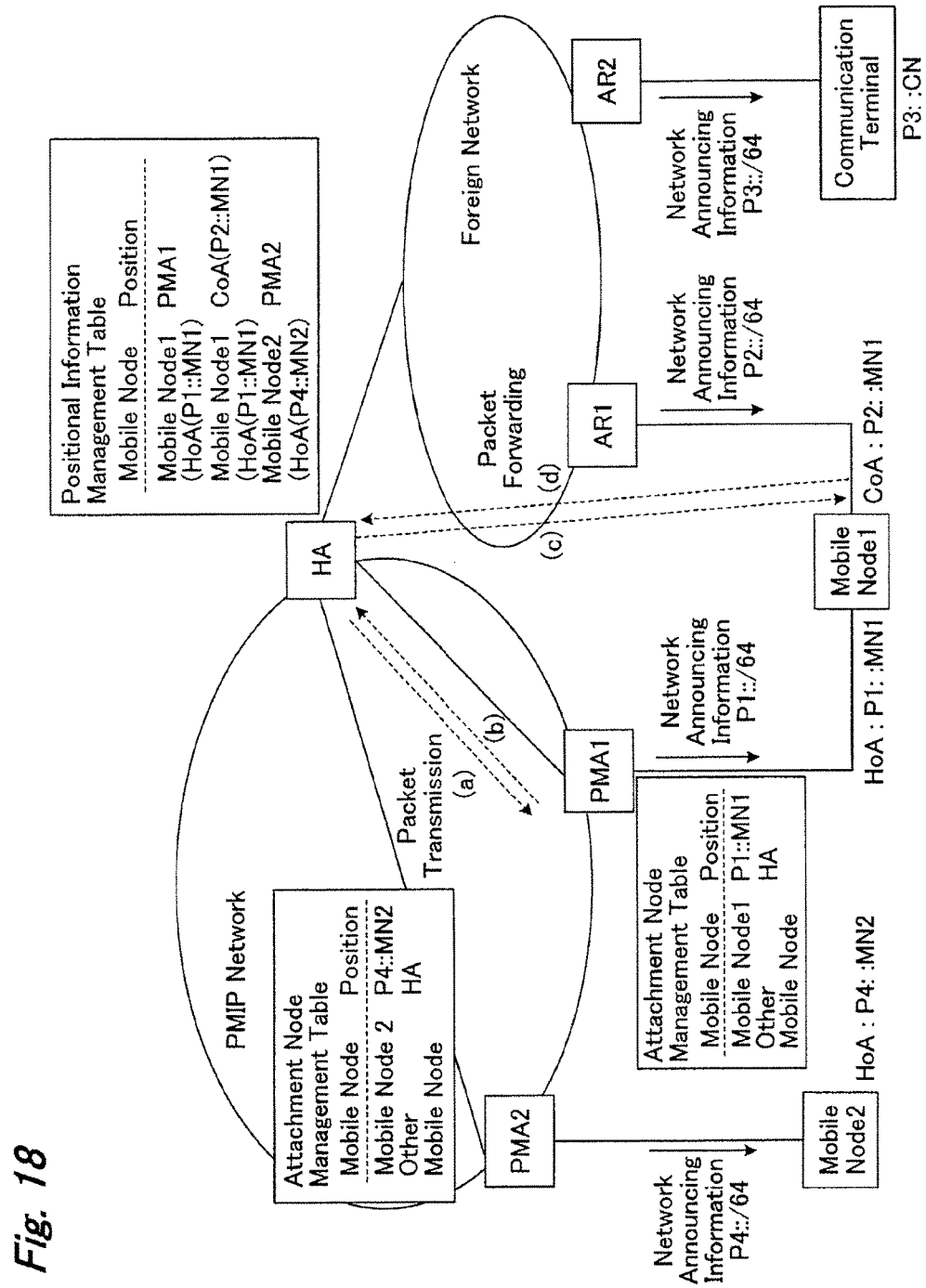
FIG. 18 A diagram for illustrating a variational example in the embodiment.

For example, as shown in FIG. 18, communication between mobile node 1 and mobile node 2 connected to the PMIP network can be performed within the PMIP network using the transmission route between the HA and PMA 1 and the transmission route between the HA and PMA 2 while communication between a communication terminal and mobile node 1 connected to the foreign network can be realized through the foreign network using the transmission route designated by the care-of address which is used by the HA and mobile node 1 to connect to the foreign network. This enables an application such as voice communication between the subscribers of the carrier that operates the PMIP network to be executed by performing communication through the PMIP network, and a case when mobile node 1 acquires contents from WEB servers connected to the foreign network by FTP or HTTP access, to be achieved by performing communication by way of a foreign network.

Figure 19:
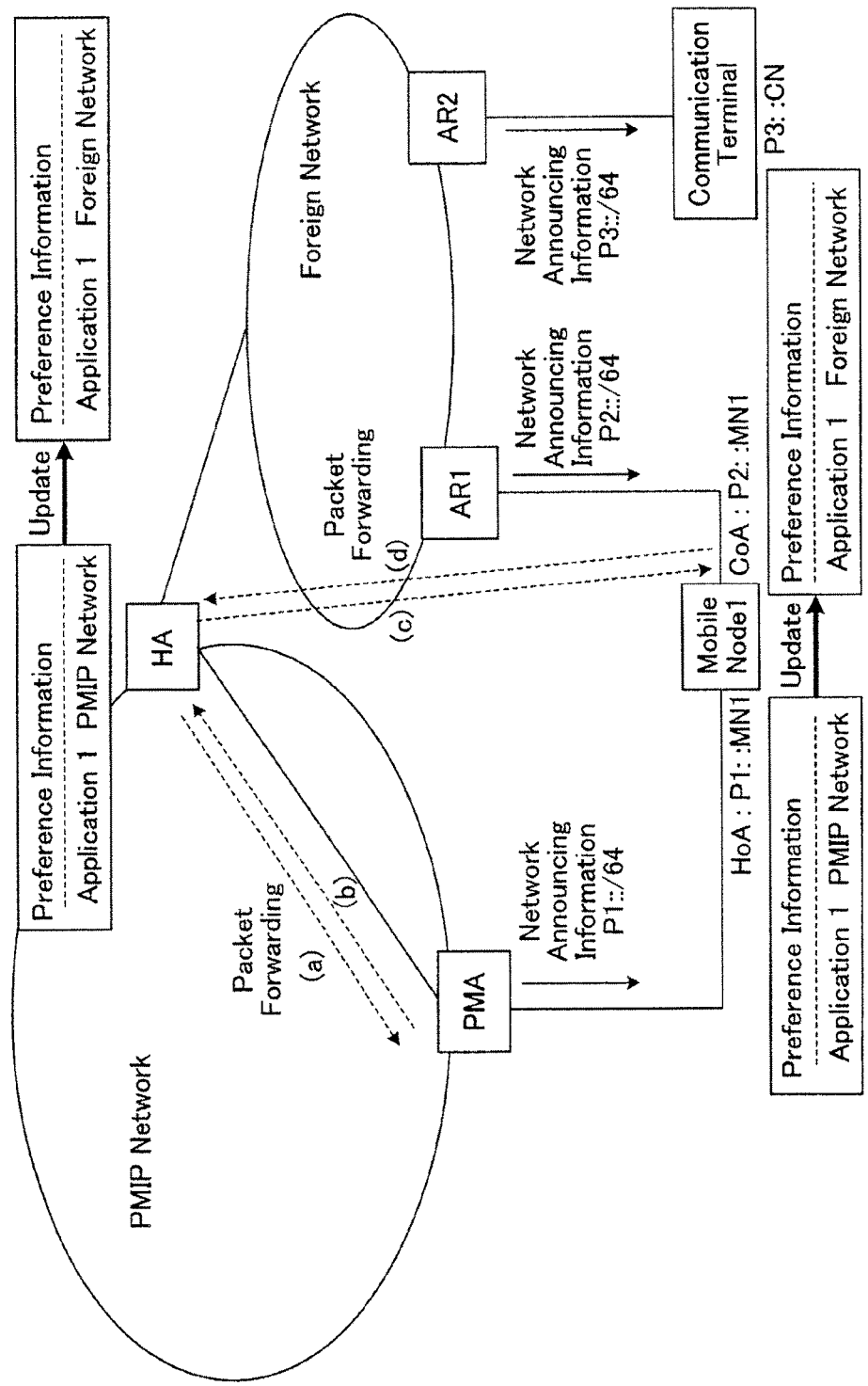
FIG. 19 A diagram for illustrating a variational example in the embodiment.
Figure 20:
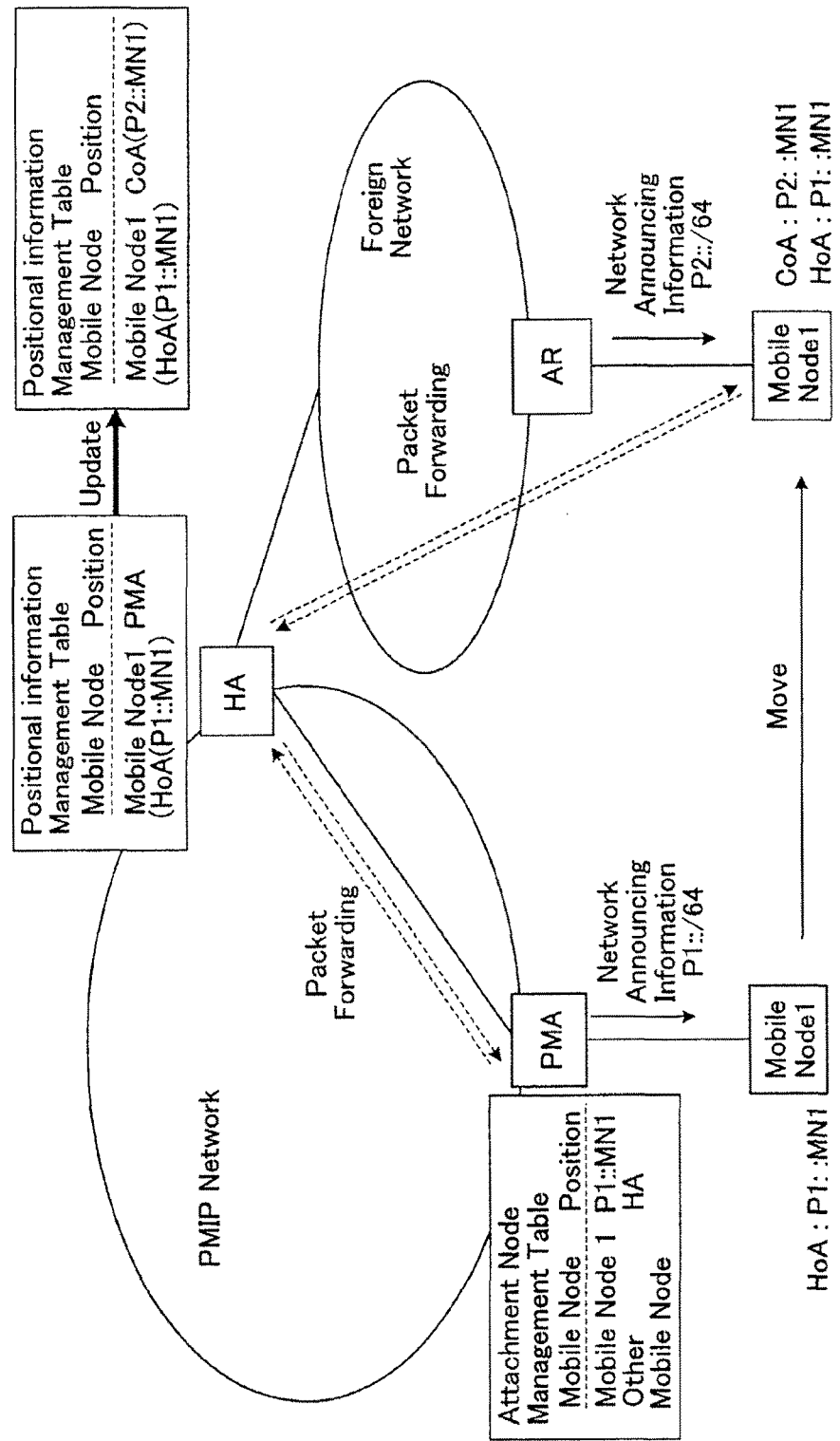
Figure 21:
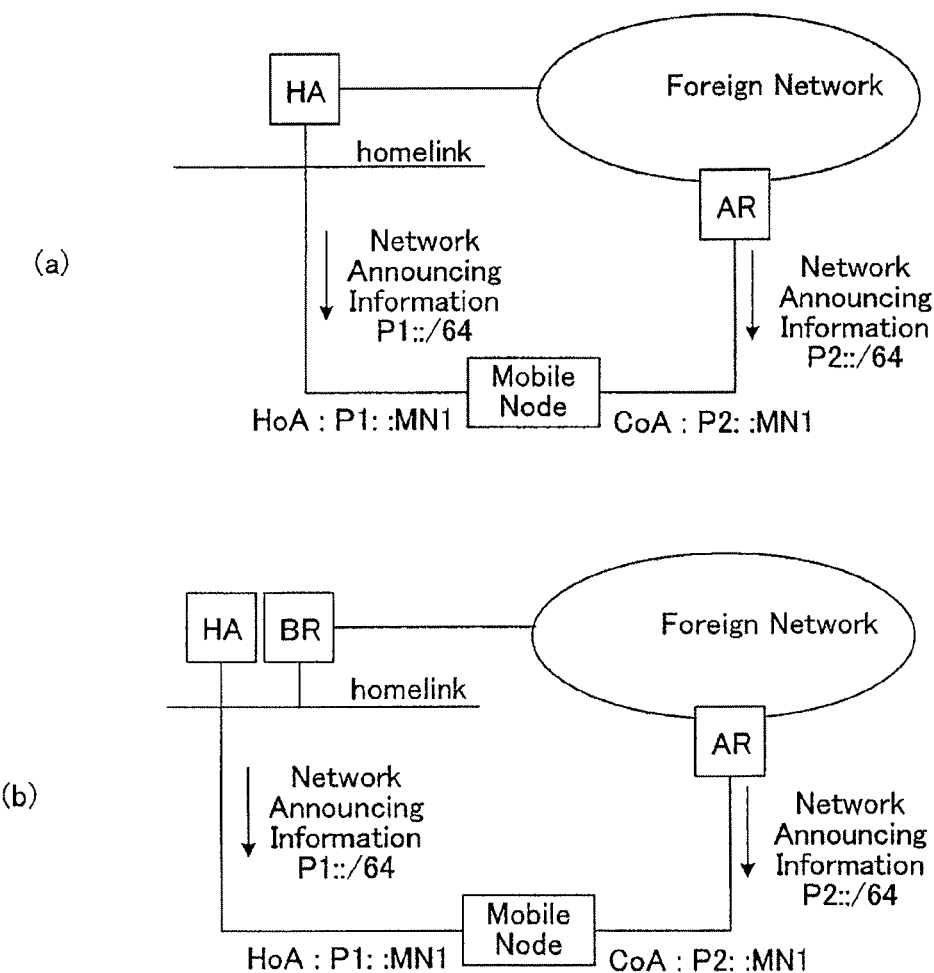
FIG. 21 A diagram for illustrating a conventional communication system.

Further, it is possible to achieve seamless handover by realizing multiple connection at the same time. The conventional handover procedure in PMIP and MIPv6 is performed by switching one connection to another. In contrast, application of the present invention enables a mobile node to realize simultaneous connection as shown in FIG. 19, whereby it is possible to achieve handover in a seamless manner by only selecting the communication route of communication data after establishment of the connecting procedure. That is, it was conventionally necessary to implement mobile detection, terminal authentication and the like in addition to position registration and establishment of a transmission route as shown in the sequence when handover is carried out. However, application of the present invention, in a condition that a plurality of them are completed, makes it possible to achieve handover by updating only the information for selection of a transmission route of preferences and the like between the HA and the mobile node.

The invention claimed is:

1. A terminal apparatus comprising:
a first transceiver configured to start a first communication route establishment procedure by transmitting control information requesting an establishment of a communication route; and
a second transceiver configured to start a second communication route establishment procedure by transmitting control information requesting an establishment of a communication route, wherein
the first communication route establishment procedure is a procedure that a position managing apparatus registers at least a first identification;
the first identification indicates a first data transfer destination to which the position management apparatus transfers data addressed to a first IP address;
the first IP address is used for communications by the terminal apparatus;
the terminal apparatus establishes a first communication route with the position managing apparatus over a first access system, based on the first communication route establishment procedure;
the second communication route establishment procedure is a procedure that the position managing apparatus registers at least a second identification;
the second identification indicates a second data transfer destination to which the position management apparatus transfers data addressed to the first IP address;
the terminal apparatus establishes a second communication route with the position managing apparatus over a second access system, based on the second communication route establishment procedure;
the terminal apparatus maintains simultaneously the first communication route and the second communication route, both of which are used for the communications using the first IP address;
the terminal apparatus performs the communications over either the first communication route or the second communication route or both; and
each data for the communications is routed at any single time over one communication route.

2. The terminal apparatus according to claim 1, wherein the first identification is an IP address of a gateway apparatus connecting the first access system with a network, and the network includes at least the position management apparatus and the gateway apparatus.

3. The terminal apparatus according to claim 1, wherein in accordance with each communication flow of the communications, route selection is performed from either the first communication route or the second communication route.

4. A communication control method for a terminal apparatus, the communication control method comprising:
starting a first communication route establishment procedure by transmitting control information requesting an establishment of a communication route, wherein
the first communication route establishment procedure is a procedure that a position managing apparatus registers at least a first identification,
the first identification indicates a first data transfer destination to which the position management apparatus transfers data addressed to a first IP address, and
the first IP address is used for communications by the terminal apparatus;
establishing a first communication route with the position managing apparatus over a first access system, based on the first communication route establishment procedure;
starting a second communication route establishment procedure by transmitting control information requesting an establishment of a communication route, wherein
the second communication route establishment procedure is a procedure that the position managing apparatus registers at least a second identification, and
the second identification indicates a second data transfer destination to which the position management apparatus transfers data addressed to the first IP address;
establishing a second communication route with the position managing apparatus over a second access system, based on the second communication route establishment procedure;
maintaining simultaneously the first communication route and the second communication route, both of which are used for the communications using the first IP address; and
performing the communications over either the first communication route or the second communication route or both, wherein each data for the communications is routed at any single time over one communication route.

5. The communication control method according to claim 4, wherein the first identification is an IP address of a gateway apparatus connecting the first access system with a network, and the network includes at least the position management apparatus and the gateway apparatus.

6. The communication control method according to claim 4, wherein in accordance with each communication flow of the communications, route selection is performed from either the first communication route or the second communication route.

7. A position managing apparatus comprising:
a first transceiver configured to connect to a first access system;
a second transceiver configured to connect to a second access system; and
a memory, wherein based on a first communication route establishment procedure initiated by a terminal apparatus, the initiation being performed by transmitting control information requesting an establishment of a communication route, the position managing apparatus registers at least a first identification into the memory;
the first identification indicates a first data transfer destination to which the position management apparatus transfers data addressed to a first IP address;
the first IP address is used for communications by the terminal apparatus;
the position managing apparatus establishes a first communication route with the terminal apparatus over the first access system, based on the first communication route establishment procedure;
based on a second communication route establishment procedure initiated by the terminal apparatus, the initiation being performed by transmitting control information requesting an establishment of a communication route, the position managing apparatus registers at least a second identification into the memory;
the second identification indicates a second data transfer destination to which the position management apparatus transfers data addressed to the first IP address;
the position managing apparatus establishes a second communication route with the terminal apparatus over the second access system, based on the second communication route establishment procedure;
the position managing apparatus maintains simultaneously the first communication route and the second communication route, both of which are used for the communications using the first IP address;
the position managing apparatus performs the communications over either the first communication route or the second communication route or both; and
each data for the communications is routed at any single time over one communication route.

8. The position managing apparatus according to claim 7, wherein the first identification is an IP address of a gateway apparatus connecting the first access system with a network, and the network includes at least the position management apparatus and the gateway apparatus.

9. The position managing apparatus according to claim 7, wherein in accordance with each communication flow of the communications, route selection is performed from either the first communication route or the second communication route.

10. A communication control method for a position managing apparatus, the communication control method comprising:
based on a first communication route establishment procedure initiated by a terminal apparatus, the initiation being performed by transmitting control information requesting an establishment of a communication route, registering at least a first identification, wherein
the first identification indicates a first data transfer destination to which the position management apparatus transfers data addressed to a first IP address, and
the first IP address is used for communications by the terminal apparatus;
establishing a first communication route with the terminal apparatus over a first access system, based on the first communication route establishment procedure;
based on a second communication route establishment procedure initiated by the terminal apparatus, the initiation being performed by transmitting control information requesting an establishment of a communication route, registering at least a second identification, wherein the second identification indicates a second data transfer destination to which the position management apparatus transfers data addressed to the first IP address;
establishing a second communication route with the terminal apparatus over a second access system, based on the second communication route establishment procedure;
maintaining simultaneously the first communication route and the second communication route, both of which are used for the communications using the first IP address; and
performing the communications over either the first communication route or the second communication route or both, and
each data for the communications is routed at any single time over one communication route.

11. The communication control method according to claim 10, wherein the first identification is an IP address of a gateway apparatus connecting the first access system with a network, and the network includes at least the position management apparatus and the gateway apparatus.

12. The communication control method according to claim 10, wherein in accordance with each communication flow of the communications, route selection is performed from either the first communication route or the second communication route.

* * * * *